(12) United States Patent
Kislyuk et al.

(10) Patent No.: US 11,620,331 B2
(45) Date of Patent: *Apr. 4, 2023

(54) TEXTUAL AND IMAGE BASED SEARCH

(71) Applicant: Pinterest, Inc., San Francisco, CA (US)

(72) Inventors: Dmitry Olegovich Kislyuk, San Francisco, CA (US); Jeffrey Harris, Oakland, CA (US); Anton Herasymenko, San Francisco, CA (US); Eric Kim, San Francisco, CA (US); Yiming Jen, San Jose, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/191,449

(22) Filed: Mar. 3, 2021

(65) Prior Publication Data

US 2021/0256054 A1  Aug. 19, 2021

Related U.S. Application Data

(63) Continuation of application No. 15/713,567, filed on Sep. 22, 2017, now Pat. No. 10,942,966.

(51) Int. Cl.

| | |
|---|---|
| *G06F 16/00* | (2019.01) |
| *G06F 16/583* | (2019.01) |
| *G06F 16/58* | (2019.01) |
| *G06F 16/738* | (2019.01) |
| *G06F 16/2457* | (2019.01) |
| *G06F 16/248* | (2019.01) |
| *G06F 16/56* | (2019.01) |

(52) U.S. Cl.
CPC ........ *G06F 16/5838* (2019.01); *G06F 16/248* (2019.01); *G06F 16/24578* (2019.01); *G06F 16/56* (2019.01); *G06F 16/583* (2019.01); *G06F 16/5866* (2019.01); *G06F 16/738* (2019.01)

(58) Field of Classification Search
CPC .. G06F 16/24578; G06F 16/248; G06F 16/56; G06F 16/583; G06F 16/5838; G06F 16/5866; G06F 16/738
USPC ................................................ 707/600–899
See application file for complete search history.

(56) References Cited

U.S. PATENT DOCUMENTS

| | | |
|---|---|---|
| 5,579,471 A | 11/1996 | Barber et al. |
| 5,596,690 A | 1/1997 | Stone et al. |
| 6,446,081 B1 | 9/2002 | Preston |
| 6,691,126 B1 | 2/2004 | Syeda-Mahmood |
| 7,117,519 B1 | 10/2006 | Anderson et al. |

(Continued)

FOREIGN PATENT DOCUMENTS

| | | |
|---|---|---|
| CA | 2495046 A1 | 2/2004 |
| EP | 2420941 A1 | 2/2012 |

(Continued)

OTHER PUBLICATIONS

Extended European Search Report for EP Application No. 14863014.8 dated Mar. 30, 2017.

(Continued)

*Primary Examiner* — Michelle N Owyang
(74) *Attorney, Agent, or Firm* — Athorus, PLLC

(57) ABSTRACT

Described is a system and method for enabling visual search for information. With each selection of an object included in an image, additional images that include visually similar objects are determined and presented to the user.

20 Claims, 17 Drawing Sheets

(56) References Cited

U.S. PATENT DOCUMENTS

| | | | |
|---|---|---|---|
| 8,185,526 B2 | 5/2012 | Wen et al. | |
| 8,190,604 B2 | 5/2012 | Wen et al. | |
| 8,280,881 B1 | 10/2012 | Zhou et al. | |
| 8,352,465 B1 | 1/2013 | Jing et al. | |
| 8,412,594 B2 | 4/2013 | Kundu | |
| 8,429,168 B1 | 4/2013 | Chechik et al. | |
| 8,909,563 B1 | 12/2014 | Jing et al. | |
| 8,983,941 B1 | 3/2015 | Murphy-Chutorian et al. | |
| 9,087,078 B2 | 7/2015 | Becherer et al. | |
| 9,098,741 B1 | 8/2015 | Anguelov et al. | |
| 9,143,573 B2 | 9/2015 | Barak et al. | |
| 9,177,225 B1 | 11/2015 | Cordova-Diba et al. | |
| 9,443,314 B1* | 9/2016 | Huang | G06K 9/6267 |
| 9,477,649 B1 | 10/2016 | Davidson et al. | |
| 9,734,167 B2 | 8/2017 | Croteau et al. | |
| 9,798,949 B1 | 10/2017 | Du et al. | |
| 9,904,949 B1 | 2/2018 | Tavernier | |
| 10,025,477 B1 | 7/2018 | Khafizova | |
| 10,043,109 B1 | 8/2018 | Du et al. | |
| 10,262,060 B1 | 4/2019 | Zeiler et al. | |
| 10,540,378 B1* | 1/2020 | Hsiao | G06F 16/5846 |
| 10,824,942 B1* | 11/2020 | Bhotika | G06F 16/56 |
| 2002/0174120 A1 | 11/2002 | Zhang et al. | |
| 2004/0013286 A1 | 1/2004 | Viola et al. | |
| 2005/0031165 A1 | 2/2005 | Olson et al. | |
| 2005/0225678 A1 | 10/2005 | Zisserman et al. | |
| 2006/0018521 A1 | 1/2006 | Avidan | |
| 2006/0112092 A1 | 5/2006 | Ziou et al. | |
| 2006/0251292 A1 | 11/2006 | Gokturk et al. | |
| 2007/0071323 A1 | 3/2007 | Kontsevich et al. | |
| 2007/0101295 A1 | 5/2007 | Ding et al. | |
| 2007/0177805 A1 | 8/2007 | Gallagher | |
| 2007/0286531 A1 | 12/2007 | Fu et al. | |
| 2008/0204569 A1 | 8/2008 | Miller et al. | |
| 2008/0226119 A1 | 9/2008 | Candelore et al. | |
| 2009/0208116 A1 | 8/2009 | Gokturk et al. | |
| 2009/0282025 A1 | 11/2009 | Winter et al. | |
| 2010/0082597 A1 | 4/2010 | Retterath et al. | |
| 2010/0106732 A1 | 4/2010 | Atallah et al. | |
| 2010/0205142 A1 | 8/2010 | Feulner et al. | |
| 2010/0205202 A1 | 8/2010 | Yang et al. | |
| 2010/0226564 A1 | 9/2010 | Marchesotti et al. | |
| 2011/0013049 A1 | 1/2011 | Thörn | |
| 2011/0029561 A1 | 2/2011 | Slaney et al. | |
| 2011/0081090 A1 | 4/2011 | Bouguet et al. | |
| 2011/0119260 A1 | 5/2011 | Hu et al. | |
| 2011/0125735 A1 | 5/2011 | Petrou | |
| 2011/0128288 A1 | 6/2011 | Petrou et al. | |
| 2011/0184950 A1 | 7/2011 | Skaff et al. | |
| 2011/0194761 A1 | 8/2011 | Wang et al. | |
| 2011/0202543 A1* | 8/2011 | Chin | G06F 16/583 |
| | | | 707/E17.02 |
| 2011/0268323 A1 | 11/2011 | Gallagher | |
| 2011/0320317 A1 | 12/2011 | Yuan et al. | |
| 2012/0030227 A1 | 2/2012 | Mital et al. | |
| 2012/0123976 A1 | 5/2012 | Wang et al. | |
| 2012/0194681 A1 | 8/2012 | Atsmon et al. | |
| 2012/0294520 A1 | 11/2012 | Mei et al. | |
| 2013/0007620 A1 | 1/2013 | Barsook et al. | |
| 2013/0060786 A1 | 3/2013 | Serrano et al. | |
| 2013/0097181 A1 | 4/2013 | Sud et al. | |
| 2013/0121600 A1* | 5/2013 | Lin | G06F 16/5862 |
| | | | 382/224 |
| 2013/0132236 A1 | 5/2013 | Gokturk et al. | |
| 2013/0188886 A1 | 7/2013 | Petrou et al. | |
| 2013/0282712 A1 | 10/2013 | Brandt | |
| 2014/0035913 A1 | 2/2014 | Higgins et al. | |
| 2014/0046935 A1 | 2/2014 | Bengio et al. | |
| 2014/0095479 A1 | 4/2014 | Chang et al. | |
| 2014/0129370 A1 | 5/2014 | Mabrey et al. | |
| 2014/0129959 A1 | 5/2014 | Battles et al. | |
| 2014/0188863 A1 | 7/2014 | Grauman et al. | |
| 2014/0250110 A1 | 9/2014 | Yang et al. | |
| 2015/0065803 A1 | 3/2015 | Douglas et al. | |
| 2015/0134688 A1 | 5/2015 | Jing et al. | |
| 2015/0142787 A1* | 5/2015 | Kimmerling | G06F 16/24578 |
| | | | 707/723 |
| 2015/0154691 A1 | 6/2015 | Curry et al. | |
| 2015/0170333 A1 | 6/2015 | Jing et al. | |
| 2015/0178317 A1 | 6/2015 | Spielberg | |
| 2015/0234918 A1 | 8/2015 | Becherer et al. | |
| 2015/0248429 A1 | 9/2015 | Pregueiro et al. | |
| 2015/0294185 A1 | 10/2015 | Cady et al. | |
| 2015/0324365 A1 | 11/2015 | Becker et al. | |
| 2015/0339391 A1 | 11/2015 | Kang et al. | |
| 2016/0005171 A1 | 1/2016 | Watanabe et al. | |
| 2016/0070809 A1 | 3/2016 | Rathus | |
| 2016/0225053 A1* | 8/2016 | Romley | G06Q 30/0623 |
| 2016/0342313 A1 | 11/2016 | Gross et al. | |
| 2017/0097945 A1 | 4/2017 | Xu et al. | |
| 2017/0098152 A1 | 4/2017 | Kerr et al. | |
| 2017/0155631 A1 | 6/2017 | Du | |
| 2017/0293859 A1* | 10/2017 | Gusev | G06F 16/24578 |

FOREIGN PATENT DOCUMENTS

| | | |
|---|---|---|
| JP | H07131653 A | 5/1995 |
| JP | 2005250797 A | 9/2005 |
| JP | 2010250426 A | 11/2010 |
| JP | 2013041332 A | 2/2013 |
| JP | 2013127809 A | 6/2013 |
| JP | 2015096148 A | 5/2015 |
| JP | 2015143951 A | 8/2015 |
| WO | 2014025592 A1 | 2/2014 |

OTHER PUBLICATIONS

Extended European Search Report for EP Application No. 16854145. 6, dated Apr. 11, 2019.

International Search Report for International Application No. PCT/US2018/051823, dated Nov. 16, 2018.

Jaworska, "A Search-Engine Concept Based on Multi-feature Vectors and Spatial Relationship", International Conference on Simulation, Modeling, and Programming for Autonomous Robots,Simpar 2010; [Lecture Notes in Computer Science; Lect. Notes Computer], Oct. 26, 2011 (Oct. 26, 2011), pp. 137-148.

Scheuer, John Davenport, "Dynamic Drive DHTML Scripts—Featured Image Zoomer", Sep. 28, 2015 (Sep. 28, 2015), XP055731727, Retrieved from the Internet URL: https://web.archive.org/web/20150928012328/http://www.dynamicdrive.com/dynamicindex4/featuredzoomer.htm [retrieved on Sep. 17, 2020], 7 pages.

Ze-Lian Li et al: "Content-Based Retrieval in Digital Libraries", In: "Fundamentals of Multimedia", Dec. 31, 2004 (Dec. 31, 2004), Pearson Prentice Hall, pp. 531-578, 531-532, and 521; figure 18.8.

* cited by examiner

TEXTUAL AND IMAGE BASED SEARCH

CROSS-REFERENCE TO RELATED APPLICATIONS

This application is a continuation of U.S. patent application Ser. No. 15/713,567, filed Sep. 22, 2017, and titled "Textual and Image Based Search," the contents of which are incorporated by reference herein in their entirety.

BACKGROUND

With the ever-expanding amount of accessible digital content available to users and customers, it continues to become more and more difficult to discover the content for which the user is searching. Several different search techniques exist, such as keyword searching, but there are many inefficiencies in such systems.

DETAILED DESCRIPTION

Figure 1A:
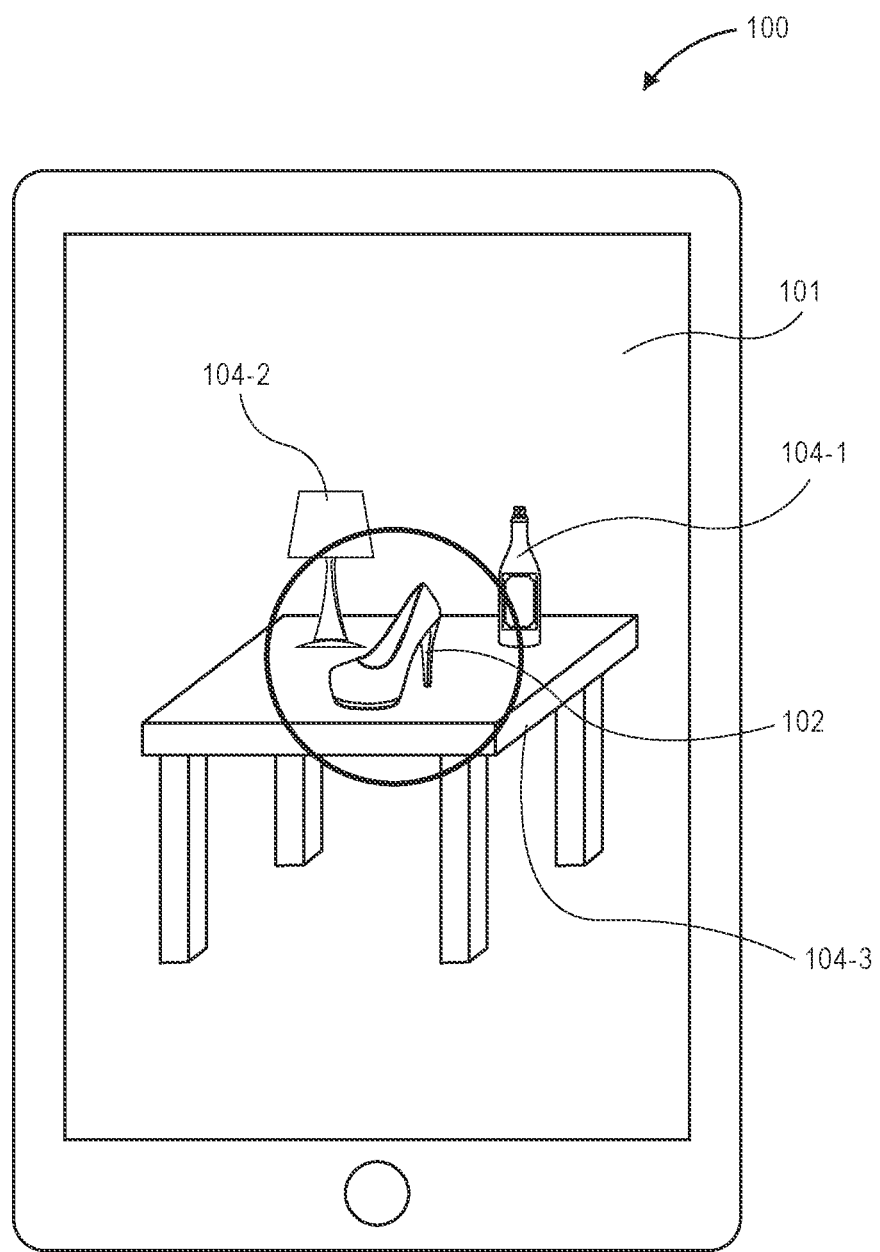
FIG. 1A illustrates an input image obtained by a user device, according to described implementations.

Described herein is a system and method that facilitates searching for information based on a selection of one or more objects of interest from a larger image and/or video. In some implementations, the image of the object may be supplemented with other forms of search input, such as text or keywords to refine results. In other implementations, the image of an object may be used to supplement or refine an existing search, such as a text or keyword search.

In many image based queries (e.g., fashion design, interior design), what interests the user is not specific objects (e.g., dress, couch, lamp) represented in the image but an entire image that includes those objects and how those objects are put together (e.g., the stylistic selection between the shirt and the skirt, the placement of a couch relative to a television). For example, a user may provide an image that includes a pair of shoes, indicate the shoes as the object of interest, and desire to see other images that include shoes that are visually similar to the selected shoes and how those other shoes are stylistically combined with other objects, such as pants, shirts, hats, purses, etc.

In one implementation, a user may begin a search by providing or selecting an image that includes an object of interest. The described implementations then may process the image to detect the object of interest and/or receive a selection from the user indicating the object of interest, as represented in the image. The portion of the image that includes the object of interest may be segmented from the remainder of the image, the object of interest determined and/or an object feature vector representative of the object of interest generated. Based on the determined object of interest and/or the object feature vector, stored feature vectors of segments of other stored images may be compared with the object feature vector of the object of interest to determine other images that include objects that are visually similar to the object of interest. The stored images may be specific images of other objects that are visually similar, or, more often, images of multiple objects that include one or more objects that are visually similar to the object of interest, thereby providing images that show how objects like the object of interest are combined with other objects. A user may select one of the presented images, select additional and/or other objects of interest, or perform other actions.

In some implementations, stored images may be segmented into various regions, objects represented in those segments determined, feature vectors representative of those objects generated and associated with the segments of those images. When an object feature vector is generated for an object of interest, the object feature vector may be compared with the stored feature vectors for various segments of stored images to detect images that include objects that are visually similar. Comparing an object feature vector with stored feature vectors corresponding to segments of an image allow images that include objects that are visually similar to an object of interest to be determined, even though those images may also include representations of many other objects.

In still further implementations, a user may select multiple objects of interest and/or may specify whether a selected object of interest is a positive object of interest or a negative object of interest. Positive objects of interest are objects selected by the user for which they are interested in seeing images with other, visually similar objects. Negative objects of interest are objects selected by the user which the user does not want included in other images. For example, if a user selects from an image positive objects of interest of a chair and a lamp and a negative object of interest of a rug, the implementations described herein will identify other images that include a chair and a lamp that are visually similar to the selected chair and lamp, and that possibly include representations of other objects, but do not include a rug that is visually similar to the selected rug.

In some implementations, an image of an object of interest may be processed to detect the type of the object of interest. Based on the determined type of object of interest, it may be determined if the object of interest type corresponds with a defined category (e.g., food, fashion, home decor). If the type of the object of interest corresponds to a defined category, multiple query types may be selected from which results for the different queries may be returned and blended together as results of the input image. For example, some query types may be configured to receive query keywords and provide image results based on the keywords. Other query types may be configured to receive image based queries, such as feature vectors, and compare the image queries with stored image information to return results corresponding to the query.

Various query types may be utilized to provide results corresponding to a defined category. For example, if the object of interest is determined to be a type of food, one query type may return content (e.g., text, image, video, audio) that are related to, but may not include, a visual representation of the object of interest. Another query type may return images and/or video that include objects that are visually similar to the object of interest. In such an example, results from the various query types may be determined and blended together to provide a single response to the query that includes results from each of the query types.

In still other examples, a user may initiate a text based query and then refine the text based query with an image of an object of interest. For example, a user may input a text based query, such as "Summer Outfits," and the described implementations may process the text based query to determine that the query corresponds to a defined category (e.g., fashion). The user may then provide an image that includes an object of interest and that object of interest may be used to refine or alter the results of the text based query. For example, if the object of interest is a red top, the search results matching the text query may be processed to detect results that include representations of other tops that are visually similar to the object of interest, in this example a red top. The results may then be ranked such that results matching the text based search and that include objects that are visually similar to the object of interest are ranked highest and presented first to the user.

FIG. 1A illustrates an input image obtained by a user device 100, according to described implementations. In this example, the user desires to search for images that include objects that are visually similar to an object of interest 102, in this example a high heel shoe. As will be appreciated, any object that may be represented in an image may be an object of interest. To provide an object of interest, a user may generate an image using one or more cameras of the user device 100, provide an image from memory of the user device 100, provide an image stored in a memory that is external to the user device 100, select an image that is provided by the systems and methods discussed herein (e.g., an image provided as a result), and/or provide or select an image from another source or location.

In this example, the user has generated an image 101 using a camera of the user device 100. The image includes multiple objects, such as a high heel shoe 102, a lamp 104-2, a bottle 104-1, and a table 104-3. Upon receipt of the image, the image may be segmented and processed to detect objects in the image and determine an object of interest for which a search is to be performed. As discussed further below, an image may be processed using any one or more of a variety of image processing techniques, such as object recognition, edge detection, etc., to identify the objects in the image.

The object of interest may be determined based on the relative size of the object, whether the object is in focus in the image, the position of the object, etc. In the illustrated example, the high heel shoe 102 is determined to be the object of interest because it is positioned toward the center of the image 101, is physically in front of the other objects 104 represented in the image, and is in focus. In other implementations, the user may select or specify the object of interest.

Upon determination of the object of interest, the input image is segmented and a feature vector representative of the object of interest is generated. Generation of feature vectors is discussed in more detail below. In contrast to typical image processing, the object of interest may be extracted or segmented from the other portions of the image 101 and the object feature vector may be generated such that the object feature vector is representative of only the object of interest. Generating an object feature vector representative of just the object of interest, rather than the entire image, improves the quality of matching described herein. Specifically, as discussed further below, stored images may be segmented, objects detected in the various segments of the stored images, and respective feature vectors generated as representative of the objects represented in those images. As such, each stored image may include multiple segments and multiple different feature vectors, each feature vector representative of an object represented in the image.

When the object feature vector representative of an object of interest is generated, it may be compared with stored feature vectors representative of individual objects included in segments of stored images. As a result, even though the entirety of a stored image may be very different than the input image 100, it may be determined that the stored image includes a representation of an object that is visually similar to the object feature vector, based on a comparison of the object of interest and a stored feature vector representative of a segment of the stored image, wherein the segment is less than the entire image.

In some implementations, a type of the object of interest may be determined and used to limit or reduce the number of stored feature vectors that are compared to the object feature vector. For example, if the object of interest is determined to be a shoe (such as a high heel shoe), the object feature vector may only be compared with stored feature vectors that are known to be representative of other shoes. In another example, the stored feature vectors may be selected for comparison based on the position within images in which a type of object is generally located. For example, again, if the object of interest is determined to be a type of shoe, it may further be determined that shoes are typically represented in the lower third of an image. In such an example, only stored feature vectors corresponding to segments of image that are in the lower third of the stored images may be compared to the object feature vector.

Figure 1B:
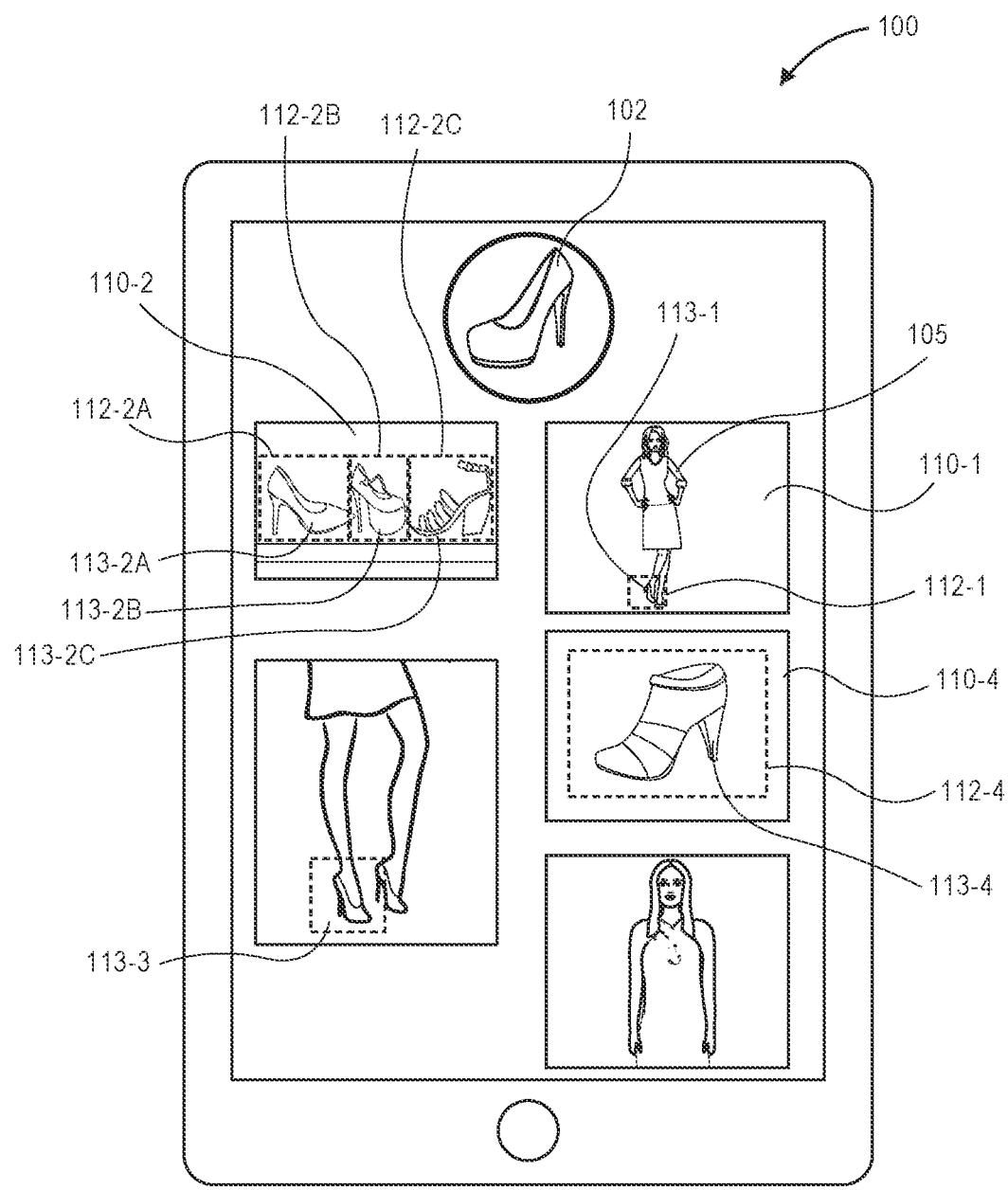
FIG. 1B illustrates visual search results for a selected object of the input image of FIG. 1A, wherein the results are images that include objects that are visually similar to the selected object, according to described implementations.

As stored feature vectors are compared to the object feature vector, a similarity score representative of the similarity between the object feature vector and the stored feature vector are determined and stored images associated with stored feature vectors that are determined to have the highest similarity scores are returned as the results of the search. For example, FIG. 1B illustrates visual search results for the object of interest, the high heel shoe 102 of the input image 100 of FIG. 1A, according to described implementations.

In this example, the object feature vector representative of the high heel shoe 102 is compared with stored feature vectors representative of objects that are represented in different segments of the stored images that are returned as the result images 110. As discussed below, stored images may be segmented, objects detected, feature vectors of those objects generated, and associations between the stored images, segments, positions of those segments in the stored images, and feature vectors maintained in a data store.

In this example, the object feature vector representative of the object of interest 102 is compared to a stored feature vector representative of the objects 113-1, 113-2A, 113-2B, 113-2C, 113-3, 113-4, etc., to determine a similarity between the object feature vector and the stored feature vectors. As illustrated, the images 110 returned in response to the search include objects in addition to objects that are determined to be visually similar to the object of interest. For example, the first image 110-1 includes a segment 112-1 that includes an object 113-1 that is determined to be visually similar to the object of interest 102, as well as other objects, such as the person 105, dress, etc. As discussed further below, the stored images that are returned may include several segments and/or objects. Alternatively, the stored images that are returned may only include a visually similar object. For example, the fourth image 110-4 includes a single segment 112-4 that includes an object 113-4 that is visually similar to the object of interest 102, but no other objects are represented in the image.

The second image 110-2 includes multiple segments 112-2A, 112-2B, 112-2C, and multiple objects 113-2A, 113-2B, 113-2C, that are of the same type as the object of interest 102. In such an example, the object feature vector may be compared to one or more feature vectors associated with the second image 110-2 and representative of the different objects. In some implementations, the similarities between the object feature vector and the stored feature vectors associated with the second image 110-2 may be averaged and the average used as the similarity for the second image 110-2. In other implementations, the highest similarity score, lowest similarity score, the median similarity score, or other similarity score may be selected as representative of the visual similarity between the object of interest and the image.

A user, upon receiving the results from the comparison of the generated object feature vector with stored feature vectors may view and/or interact with the images 110 provided in response thereto. The images may be ranked and presented such that the images associated with stored feature vectors having a higher similarity score are ranked higher and presented before images associated with feature vectors having a lower similarity score.

Figure 2:
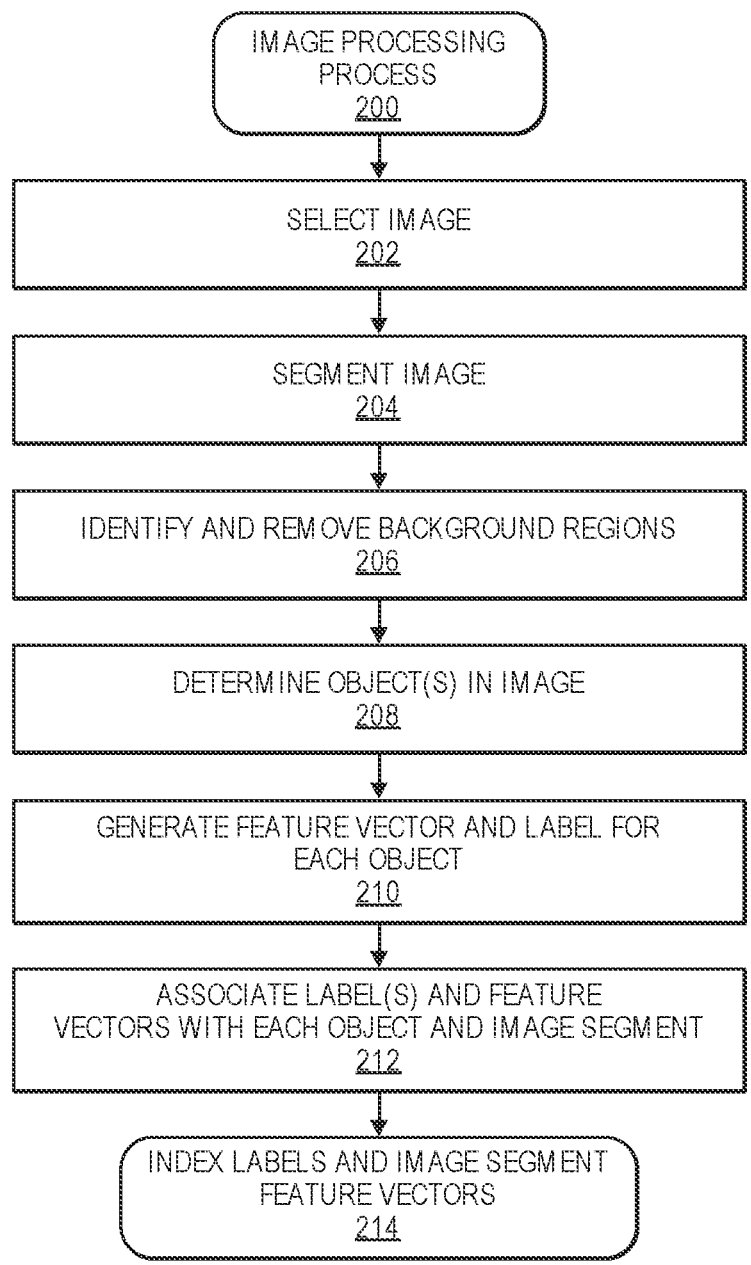
FIG. 2 is an example image processing process, according to described implementations.

FIG. 2 is an example image processing process that may be executed to generate stored feature vectors and labels representative of segments and objects of stored images that are maintained in a data store, according to described implementations. The example process 200 begins by selecting an image for processing, as in 202. Any image may be processed according to the implementations discussed with respect to FIG. 2. For example, images stored in an image data store, an image produced by a camera of a user device, images maintained in a memory of the user device, or any other image may be selected for processing according to the example process 200. In some instances, the image processing process 200 may be used to generate segments, labels, and/or corresponding feature vectors for all objects of a stored image such that the segments, labels, and/or feature vectors may be associated with the stored images and available for use in determining if an object of interest is visually similar to one or more objects represented in a stored image. In another example, the image processing process 200 may be performed on an input image to generate a label and/or object feature vector of a determined object of interest.

Upon selection of the image, the image is segmented, as in 204. Any variety of segmentation techniques, such as circle packing algorithm, super-pixels, etc., may be used. The segments of the image may then be processed to remove background regions of the image from consideration, as in 206. Determining background regions may be done, for example, using a combination of attentive constraints (e.g., salient objects are likely to be at the center of the image segment) and unique constraints (e.g., salient objects are likely to be different from the background). In one implementation, for each segment ($S_i$), a unique constraint may be computed using a combination of color, texture, shape and/or other feature detection. The pairwise Euclidian distances for all pairs of segments: $L2(S_i, S_j)$ may also be computed for $\forall S_i \in S$, $\forall S_j \in S$. The unique constraint U for segment $S_i$, or $U_i$, may be computed as $U_i = \Sigma_j L2(S_i, S_j)$. The attentive constraint for each Segment $S_i$ may be computed as $A=[X(s)-X']^2+[Y(s)-Y']^2$, where X' and Y' are the center coordinates of the image.

One or more of the segments S', a subset of S, may then be selected such that $U(s)-A(\underline{s})>t$, where t is a threshold set manually or learned from the data. The threshold t may be any defined number or amount utilized to distinguish segments as background information or potential objects. Alternatively, Similarity($s_i' \in S'$, $r_i \in R-$) and Similarity($s_i' \in S'$, $r_i \in R+$), where $s_i'$ is an element of S' and $r_i$ is an element R−, and R− is a set of image non-salient regions (background), may be computed and used as the similarity between each segment to a labelled database of labelled salient segments and non-salient segments. The final score is:

$$U(s_i')-A(s_i')+\text{Similarity}(s_i' \in S', r_i \in R+)-\text{Similarity}(s_i' \in S', r_i \in R-)>t$$

In another implementation, the selection of the parts-of-interest to the past interaction of the same user may be determined. The final segment S' may then be clustered to form one or more segments, where each segment is a distinctive part of the image.

Returning to FIG. 2, upon removing the background segments, the objects remaining in the image are determined, as in 208. Objects remaining in the image may be determined, for example, by using a sliding window approach to compute the score of each possible hypothesis of the location of the object. Using approaches such as boosted selection of Harr-like wavelets, or multiple-parts based models, each segment may be processed to determine potentially matching objects. For example, a feature vector may be determined for a segment and compared to information stored for objects. Based on the feature vector and the stored information, a determination may be made as to how similar the feature vector is to the stored feature vectors for particular objects and/or particular types of objects.

The sliding window approach may be performed N times, each with a different trained object classifier or label (e.g., person, bag, shoes, face, arms, hat, pants, top, etc.). After determining a hypothesis for each object classifier, the output is a set of best hypotheses for each object type. Because objects do not generally appear randomly in images (e.g., eyes and noses typically appear together), position-sensitive constraints may also be considered. For example, positions of the root object (e.g., person) may be defined as W(root) and each geometric constraint for each object k may be denoted with respect to each other as $\lambda_{\vec{k}}(O)$, a 6-element vector. The geometric "fit" of each object $W_{oi}$ with respect to the root object $W_{root}$ may be defined by $\vec{L}(\vec{\lambda}(i)(W_o)*\Theta)$, $\Theta_i = [dy, dx^2, dy^2, dxdy, z]$, where dx, dy are the average geometric distance between each pixel in the object box $W_{oi}$ and each pixel in the root object box. The problem of finding optimal $\lambda_{\vec{k}}$ can be formulated as, arg min $\lambda_i$ $\vec{L}(\vec{\lambda}(i)*D_{train}(\Theta_i)$ where $D_{train}(\Theta_i)$ is the observed value of $\Theta_i$ in training or other stored images.

To optimize this function, the location of the objects in the image may be determined. For example, the center of a root object (e.g., person) in the image is marked as (0, 0), and the location of other objects in the processed image is shifted with respect to the root object. A linear-Support Vector Machine (SVM) is then applied with $\Theta_i$ as parameters. The input to the SVM is $D_{train}(\Theta_i)$. Other optimizing approaches, such as linear programming, dynamic programming, convex optimizations, and the like, may also be used alone or in combination with the optimization discussed herein. The training data $D_{train}(\Theta_k)$, can be collected by having users place a bounding box on top of both the entire object and the landmarks. Alternatively, semi-automated approaches, such as facial detection algorithms, edge detection algorithms, etc., may be utilized to identify objects. In some implementations, other shapes, such as ovals, ellipses, and/or irregular shapes may be used to represent objects.

Figure 13:
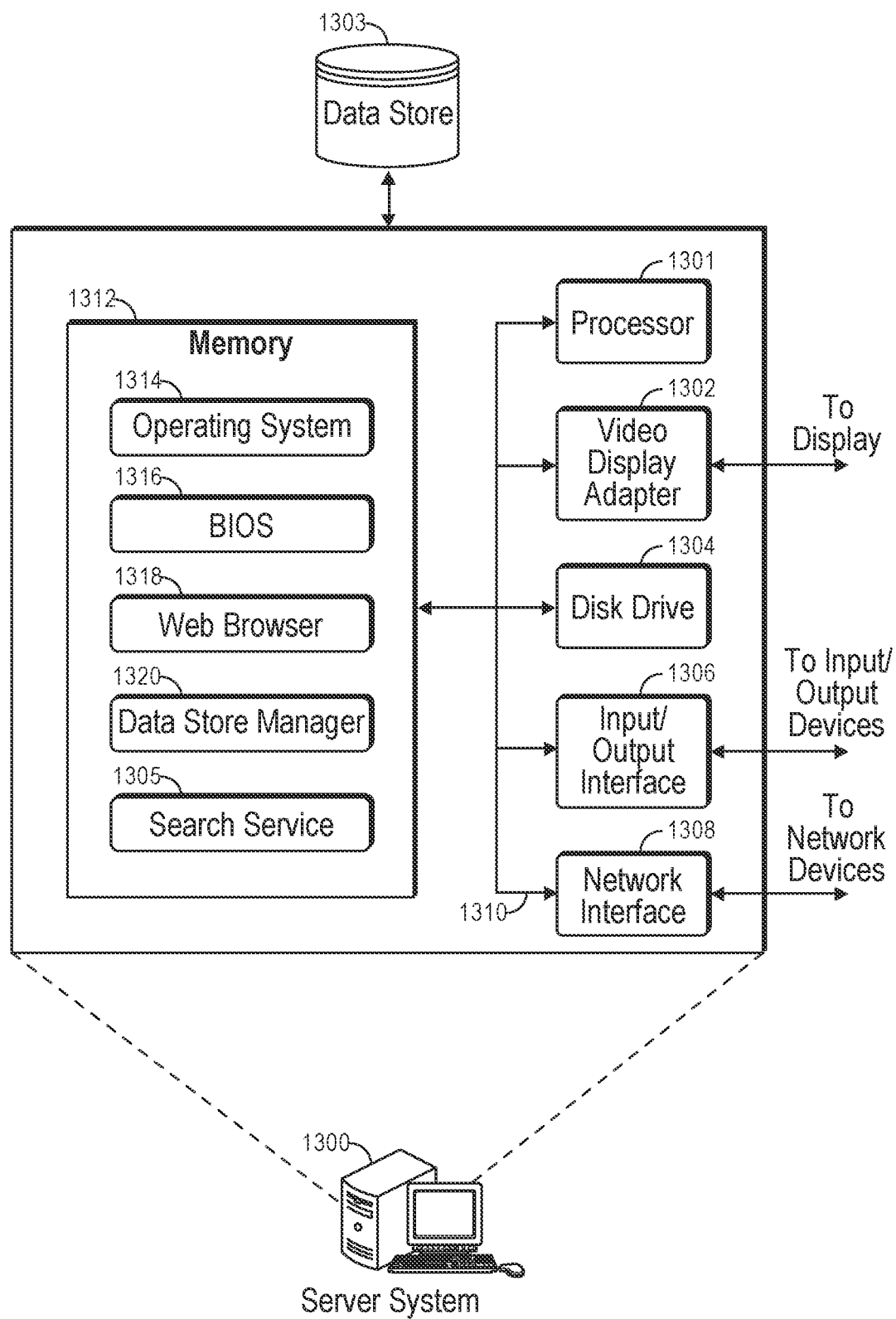
FIG. 13 is a pictorial diagram of an illustrative implementation of a server system that may be used for various implementations.

Returning to FIG. 2, a feature vector and a label are generated and associated with each identified object, as in 210 and 212. Specifically, the bounding box that contains the object may be associated with a label and the feature vector generated for the segment and the associations maintained in a data store 1303 (FIG. 13). In addition, a position and/or size of the bounding box that forms the segment of the image may be associated and stored in the image. The size and/or position of the segment may be stored, for example, as pixel coordinates (x, y) corresponding to the edges or corners of the bounding box. As another example, the size and/or position of the segment may be stored as column and/or row positions and size.

The label may be a unique identifier (e.g., keyword) representative of the object. Alternatively, the labels may include classification information or object type. For example, labels associated with representations of clothing may include an apparel classifier (such as a prefix classifier) in addition to a unique identifier for the object. In still other implementations, the label may indicate attributes of the object represented in the image. Attributes may include, but are not limited to size, shape, color, texture, pattern, etc., of the object. In other implementations, a set of object attributes (e.g., color, shape, texture) may be determined for each object in the image and the set may be concatenated to form a single feature vector representative of the object. The feature vector may then be translated into a visual-label through the use of visual vocabularies. Visual vocabularies may be generated by running clustering algorithms (e.g., K-means) on features generated from a large dataset of images and the center of the cluster becomes the vocabulary set. Each single feature vector may be stored and/or translated to one or more vocabulary terms that is the most similar to the feature space (e.g., n).

After associating a label and feature vector with each object represented in the image, the objects and corresponding image segments are indexed, as in 214. Each object may be indexed using standard text-based retrieval techniques. However, unlike standard text or visual search, multiple indexes may be maintained in the data store 1303 (FIG. 13) and each object may be associated with one or more of the multiple indexes.

Figure 3:
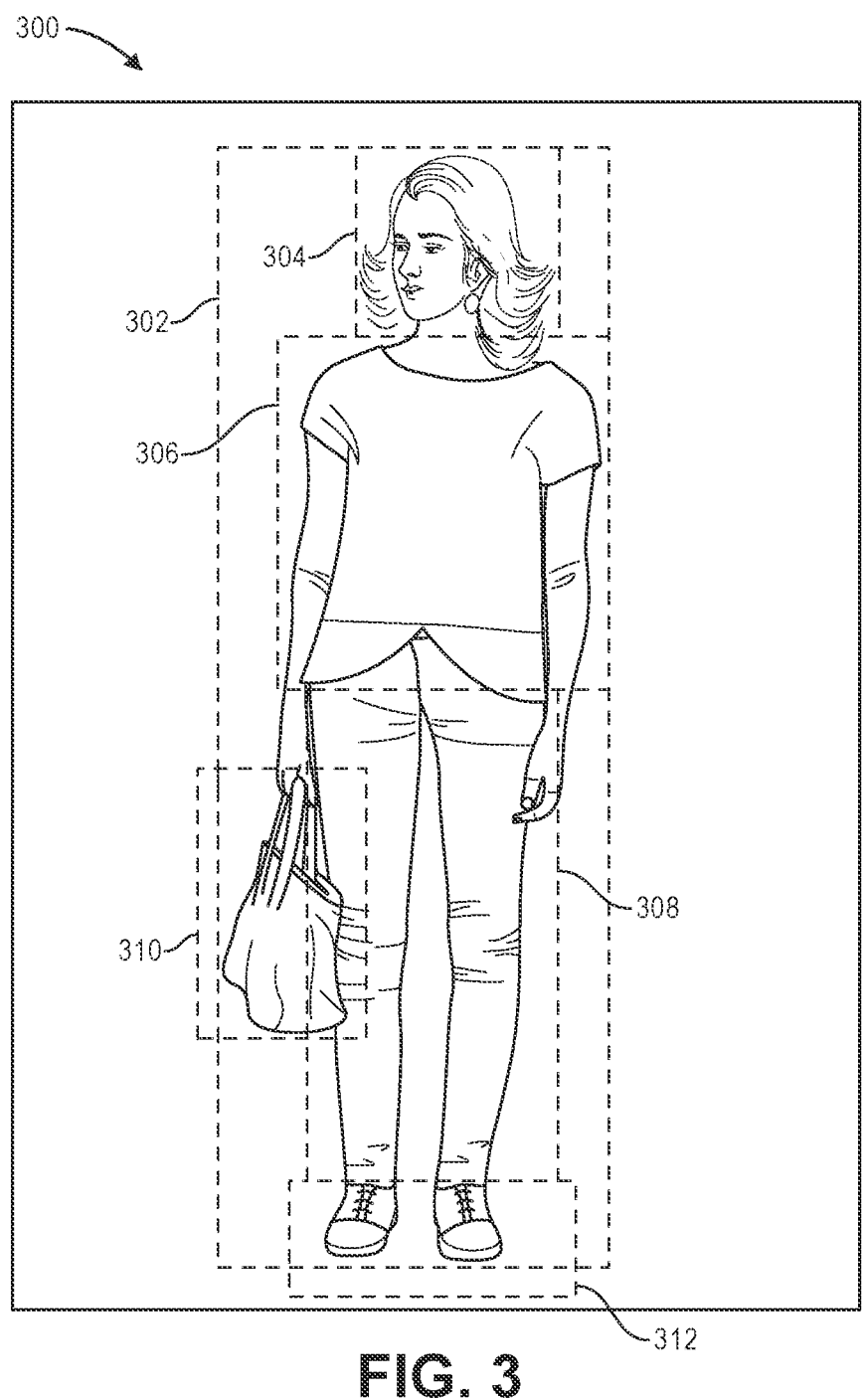
FIG. 3 is a representation of a segmented image, according to an implementation.

FIG. 3 is a representation of a segmented image that may be maintained in a data store, according to an implementation. An image, such as image 300, may be segmented using the segmentation techniques discussed above. Using the example routine 200, the background segments have been removed and six objects in the image have been segmented and identified. Specifically, a body object 302, a head object 304, a top object 306, a pants object 308, a bags object 310, and a shoes object 312. As part of the segmenting, the root object, in this example the body object 302, was determined and the location of other objects 304-312 considered when identifying those other objects. As the object types are determined, labels or other identifiers are generated and associated with the image segments and the image.

In addition to indexing the segments, determining the objects, generating labels, and associating the segments and labels with the image 300, feature vectors representative of each object within the image 300 may be generated, stored in the datastore, and associated with the image 300, segments, and labels. For example, a feature vector representative of the size, shape, color, etc., of the purse object may be generated and associated with the image 300 and the segment 310. Feature vectors representative of the other objects detected in the image may likewise be generated and associated with those objects, segments, and the image 300.

In other implementations, an image may be segmented using other segmentation and identification techniques. For example, images may be segmented using crowd sourcing techniques. For example, as users view an image, they may select regions of the image that include objects and label those objects. As more users identify objects within images, the confidence of the identity of those objects increases. Based on the user provided segmentation and identification, the objects within the image can be indexed and associated with other visually similar objects included in other images.

Figure 4:
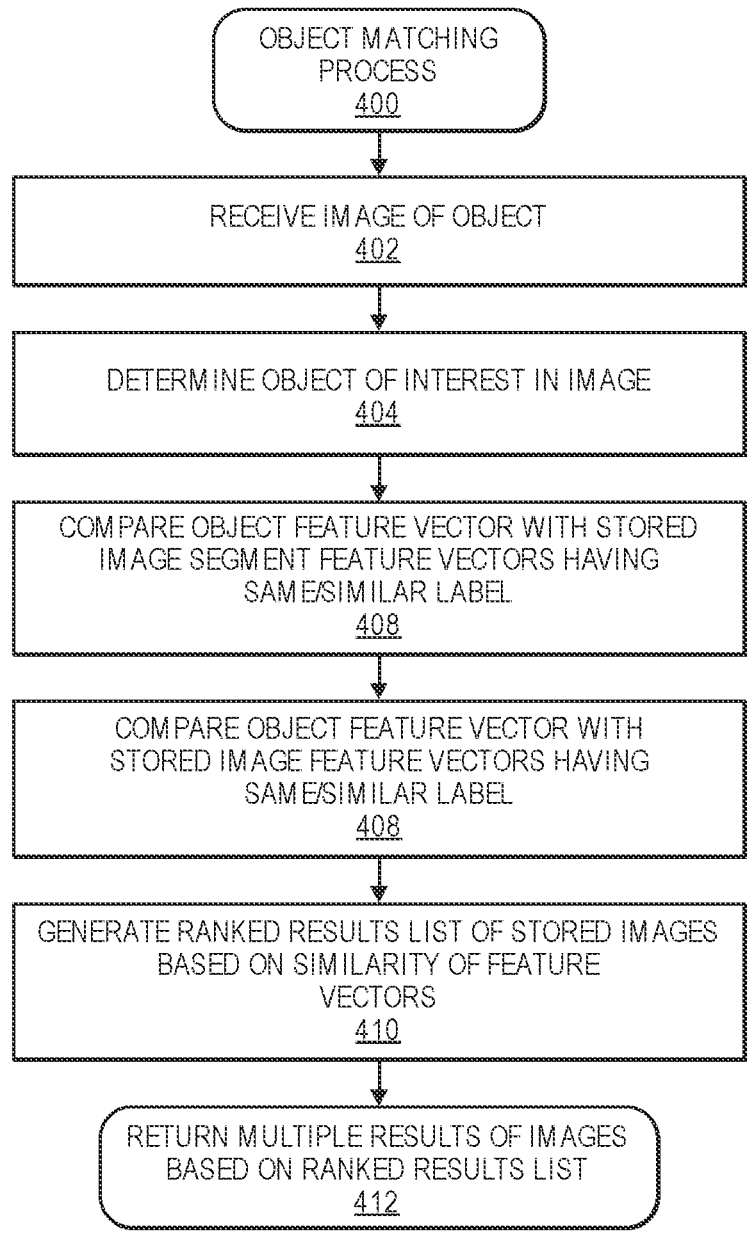
FIG. 4 is an example object matching process, according to described implementations.

FIG. 4 is an example object matching process 400, according to described implementations. The example process 400 begins by receiving an image that includes a representation of one or more objects, as in 402. As with the other examples discussed herein, the image may be received from any of a variety of sources.

Upon receipt of an image, the image is processed using all or a portion of the image processing process 200, discussed above, and an object of interest represented in the image is determined, as in 404. In some implementations, the entire image processing process 200 may be performed and then an object of interest determined from the objects detected as part of the example process 200. In other implementations, one or more object detection algorithms may be performed to determine potential objects in the image and then one of the potential objects may be selected as the object of interest and the example process 200 performed with respect to that potential object.

For example, an edge detection or object detection algorithm may be performed to detect potential objects in the image and then the position of the potential objects, clarity or focus of the potential objects, and/or other information may be utilized to detect the object of interest. For example, in some implementations, the object of interest may be determined to be toward a center of the image, in focus, and positioned in a foreground of the image. In other implementations, a user may provide an indication or selection of a segment of the image that includes the object of interest.

Upon determination of the object of interest, the image processing process 200 may be performed for that object and/or the segment of the image that includes the object to identify the object, generate an object feature vector representative of the object, and produce a label corresponding to a type of the object, as in 406.

The generated object feature vector and/or label may then be compared with stored feature vectors corresponding to objects represented in segments of stored images to produce a similarity score between the object feature vector and each stored feature vector, as in 408. In some implementations, rather than comparing the object feature vector with every stored feature vector, a label representative of the object type may be utilized to reduce the stored feature vectors to include only those having the same or similar label. For example, if the object of interest is determined to be shoes, the object feature vector may only be compared with stored feature vectors having a shoes label, thereby limiting the comparison to objects of the same type.

In other implementations, in addition to or as an alternative to comparing the object feature vector with stored feature vectors having the same or similar labels, the position of the segments of the stored images may be utilized as a factor to determine whether the object of interest is expected to be positioned in particular segments of the stored images. For example, if the object of interest is determined to be shoes, it may further be determined that segments in a lower third of the stored images are most likely to include shoe objects and the comparison of feature vectors may be limited to segments in the lower third portion of the stored images. Alternatively, the position of the object of interest when compared with a root object (such as a person) may be determined and utilized to select feature vectors corresponding to segments of stored images based on the relative position with respect to a root object, as discussed above.

Comparison of the object feature vector with stored feature vectors produces similarity scores indicating the similarity between the object feature vector and the stored feature vector with which it is compared. Images associated with stored feature vectors having a higher similarity score are determined to be more responsive to the search and image matching than stored images associated with feature vectors having a lower similarity score. Because stored images may be associated with multiple stored features vectors that may be compared with an object feature vector, in some implementations, an average similarity score may be determined for the image based on the similarity scores determined for each associated stored feature vector. In other implementations, the similarity score of an image having multiple stored feature vectors that are compared with the object feature vector may be the median similarity score, the lowest similarity score, or any other variation of the similarity scores for feature vectors associated with that stored image.

Based on the similarity scores determined for each image, a ranked list of stored images is generated, as in 410. In some implementations, the ranked list may be based only on the similarity scores. In other implementations, one or more of the stored images may be weighted higher or lower based on other factors, such as, but not limited to, the popularity of the stored image, whether the user has previously viewed and/or interacted with the stored image, a number of stored feature vectors associated with the stored image, a number of feature vectors associated with the stored image that were compared with the object feature vector, a number of stored feature vectors associated with the stored image and having the same or similar label as the object of interest, etc.

Finally, multiple results of stored images are returned, for example to the user device, based on the ranked results list, as in 412. In some implementations, the example process 400 may be performed in whole or in part by a remote computing resource that is remote from a user device and multiple results of images corresponding to the ranked results list may be sent to a user device for presentation to a user in response to a user device submitting an image of an object of interest. In other implementations, parts of the example process 400 may be performed on the user device and parts of the example process 400 may be performed on the remote computing resources. For example, program instructions stored in a memory of the user device may be executed and cause one or more processors on the user device to receive the image of the object, determine the object of interest, and/or generate a label or object feature vector representative of the object of interest. The object feature vector and/or label may then be sent from the user device to the remote computing resources and code executing on the remote computing resources may cause one or more processors of the remote computing resources to compare the received object feature vector with one or more stored feature vectors to produce similarity scores, generate a ranked results list and send images corresponding to the ranked results list back to the user device for presentation to the user as being responsive to the input image that includes the object of interest. In other implementations, different aspects of the example process 400 may be performed by different computing systems at the same or different locations.

Figure 5:
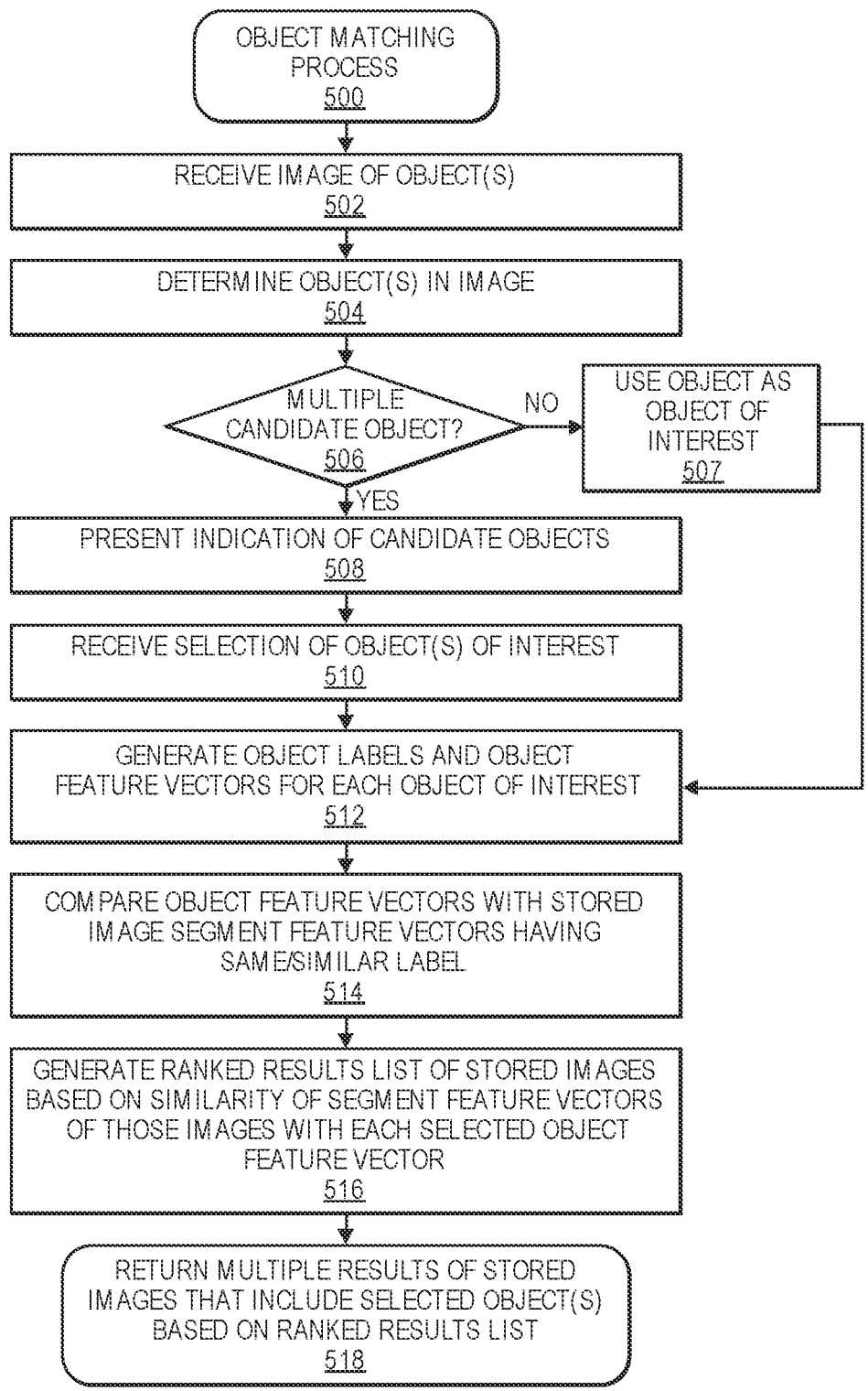
FIG. 5 is another example object matching process, according to described implementations.

FIG. 5 is another example object matching process 500, according to described implementations. The example process 500 begins by receiving an image that includes a representation of one or more objects, as in 502. As with the other examples discussed herein, the image may be received from any of a variety of sources.

Upon receipt of an image, the image is processed using all or a portion of the image processing process 200, discussed above, and one or more objects of interest represented in the image is determined, as in 504. In some implementations, the entire image processing process 200 may be performed and candidate objects of interest determined from the objects detected as part of the example process 200. In other implementations, one or more object detection algorithms may be performed to determine candidate objects in the image.

For example, an edge detection or object detection algorithm may be performed to detect objects in the image and then the position of the potential objects, clarity or focus of the potential objects, and/or other information may be utilized to detect candidate objects of interest. For example, in some implementations, the candidate objects of interest may be determined to be toward a center of the image, in focus, positioned in a foreground of the image, and/or positioned near one another.

A determination is then made as to whether there are multiple candidate objects of interest represented in the image, as in 506. If it is determined that there are not multiple candidate objects of interest, the single detected object is utilized as the object of interest, as in 507. If it is determined that there are multiple candidate objects of interest, the image may be presented to the user with identifiers indicating each of the candidate objects of interest so that the user can select one or more of the candidate objects as the object(s) of interest, as in 508. For example, the image may be presented on a touch based display of a user device with visual identifiers positioned adjacent each candidate object. The user may then provide an input by selecting one or more of the candidate objects as the object(s) of interest. The user input is then received by the example process and utilized to determine the object(s) of interest, as in 510.

In some implementations, a user may be able to specify both objects of interest and objects not of interest or that are to be given a negative weight in determining images that match the search. For example, if multiple objects are detected in the image and presented to the user for selection, the user may provide a positive selection, indicating the object as an object of interest, a negative selection, indicating the object as an object that is not of interest, or no selection, which will not be considered in determining stored images that match the search.

Upon determination of the objects of interest or if there is only one object of interest, the image processing process 200 may be performed for those objects and/or the segments of the image that include the objects to identify the objects, generate feature vectors representative of each object, and produce a label corresponding to a type of each object, as in 512. In examples that include both objects of interest and objects not of interest, the example process 200 (FIG. 2) may be performed for both types of objects and feature vectors/labels created for both objects of interest and objects not of interest.

The generated object feature vectors and/or labels may then each be compared with stored feature vectors corresponding to objects represented in segments of stored images to produce similarity scores between each object feature vector and each stored feature vector, as in 514. In some implementations, rather than comparing the object feature vectors with every stored feature vector, labels representative of the object types may be utilized to reduce the stored feature vectors that are compared with the different object feature vectors such that only stored feature vectors are compared with object feature vectors of the same or similar type. For example, if one of the objects of interest is determined to be shoes, the object feature vector for that object may only be compared with stored feature vectors having a shoes label. Likewise, if a second object of interest is determined to be a top, the object feature vector for that object may only be compared with stored feature vectors having a top label.

In other implementations, in addition to or as an alternative to comparing the object feature vector with stored feature vectors having the same or similar labels, the position of the segments of the stored images may be utilized as a factor to determine whether the object of interest is expected to be positioned in particular segments of the stored images. For example, if the object of interest is determined to be shoes, it may further be determined that segments in a lower third of the stored images are most likely to include shoe objects and the comparison of feature vectors may be limited to segments in the lower third portion of the stored images. Alternatively, the position of the object of interest when compared with a root object (such as a person) may be determined and utilized to select feature vectors corresponding to segments of stored images based on the relative position with respect to a root object, as discussed above.

Comparison of the object feature vectors with stored feature vectors produces similarity scores indicating the similarity between each object feature vector and the stored feature vectors with which it is compared. Images associated with stored feature vectors having a higher similarity score are determined to be more responsive to the search and image matching than stored images associated with feature vectors having a lower similarity score. Because stored images may be associated with multiple stored features vectors that may be compared with one or more object feature vectors, in some implementations, an average similarity score may be determined for the image based on the similarity scores determined for each associated stored feature vector. In other implementations, the similarity score of an image having multiple stored feature vectors that are compared with multiple object feature vectors may generate two similarity scores, one for each object feature vector. In examples that include similarity scores for objects that are not of interest, a similarity score may likewise be determined by comparing the feature vector for the object not of interest with stored feature vectors.

Based on the similarity scores determined for each image, a ranked list of stored images is generated, as in 516. In some implementations, the ranked list may be based only on the similarity scores. In implementations in which multiple similarity scores are determined for different objects of interest, the ranked list may be determined such that images associated with high similarity scores for both objects of interest are ranked higher than images with high similarity scores for just one of the objects of interest. Likewise, if the user has specified an object that is not of interest, images that include objects that are visually similar to the object that is not of interest, as indicated by a high similarity score between the object feature vector representative of the object not of interest and one or more stored feature vectors associated with the image, may be decreased in rank. In some implementations, other factors may be considered in ranking stored images. For example, one or more of the stored images may be weighted higher or lower based on, for example, the popularity of the stored image, whether the user has previously viewed and/or interacted with the stored image, a number of stored feature vectors associated with the stored image, a number of feature vectors associated with the stored image that were compared with the object feature vectors, a number of stored feature vectors associated with the stored image and having the same or similar label as one of the objects of interest, etc.

Finally, multiple results of stored images are returned, for example to the user device, based on the ranked results list, as in 518. In some implementations, the example process 500 may be performed in whole or in part by a remote computing resource that is remote from a user device and multiple results of images corresponding to the ranked results list may be sent to a user device for presentation to a user in response to a user device submitting an image of an object of interest. In other implementations, parts of the example process 500 may be performed on the user device and parts of the example process 500 may be performed on the remote computing resources. For example, program instructions stored in a memory of the user device may be executed and cause one or more processors on the user device to receive the image of the object, determine the object of interest, and/or generate a label or object feature vector representative of the object of interest. The object feature vector and/or label may then be sent from the user device to the remote computing resources and code executing on the remote computing resources may cause one or more processors of the remote computing resources to compare the received object feature vector with one or more stored feature vectors to produce similarity scores, generate a ranked results list and send images corresponding to the ranked results list back to the user device for presentation to the user as being responsive to the input image that included the object of interest. In other implementations, different aspects of the example process 500 may be performed by different computing systems at the same or different locations.

Figure 6A:
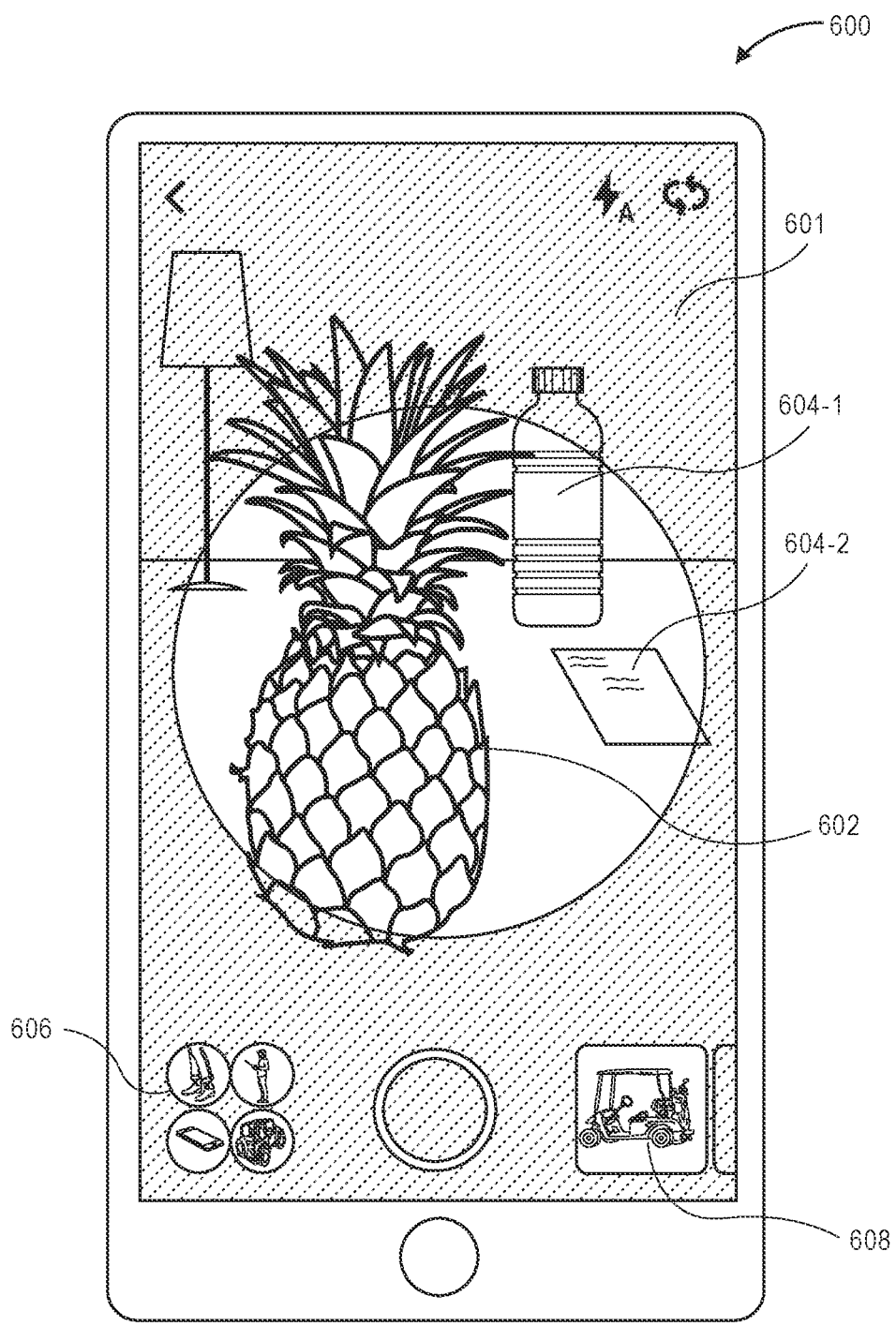
FIG. 6A illustrates an input image obtained by a user device, according to described implementations.

FIG. 6A illustrates an input image 601 obtained by a user device 600 that is used to produce search results, according to described implementations. Similar to the examples discussed above, the input image may be received or obtained from any source. In this example, the input image is captured by a camera of the user device 600 and includes a representation of a pineapple 602, a water bottle 604-1, and a sheet of paper 604-2. In other implementations, a user may select the image control 608 and select an image stored in a memory of the user device or otherwise accessible to the user device. Alternatively, the user may select the remote image control 606 and view/select an image from a plurality of images stored in a memory that is remote from the user device.

In this example, in addition to processing the image to detect one or more objects of interest in the image, it may be determined whether the object of interest corresponds to a defined category. Defined categories may include, but are not limited to, food, home decor, and fashion. A category may include multiple different types of objects. For example, food may contain thousands of types of food objects, such as pineapples.

If it is determined that the object of interest corresponds to a defined category, multiple query types may be selected and utilized to generate results that are blended together as responsive to the query of the input image. The different query types may include different types or styles of queries. For example, one query type may be a visual based search that searches images that are visually similar to the object of interest or include image segments that are visually similar to the object of interest, as discussed above. Another query type may be a text based query that searches for and determines content indicating how the object of interest can be used or combined with other objects of interest. For example, if the defined category is food, a first query type may return results that include images of food that are visually similar to the object of interest. The second query types may return results that include images of combinations of different foods or recipes that include the food determined to be the object of interest.

In examples with multiple query types, the input utilized for each query type may be different. For example, a first query types that utilizes a visual or image based search, may be configured to receive an object feature vector representative of the object of interest and that object feature vector may be compared with stored feature vectors, as discussed above, to detect stored images that include objects that are visually similar to the object of interest. In comparison, the query type may be configured to receive text/keyword inputs to determine stored images that, while not visually similar to the object of interest, include labels matching the keywords and/or are otherwise relate to the object of interest.

In examples in which one of the query types is configured to receive text/keyword input to search the data store of stored images, keywords or labels corresponding to the object of interest and/or the category may be generated and used to query the respective stored images.

In some implementations, each query type may search content maintained in the same data source but return different results due to the variation in the query types and how they query the stored content. In other implementations, one or more of the query types may search different content maintained in the same or different data stores.

Figure 6B:
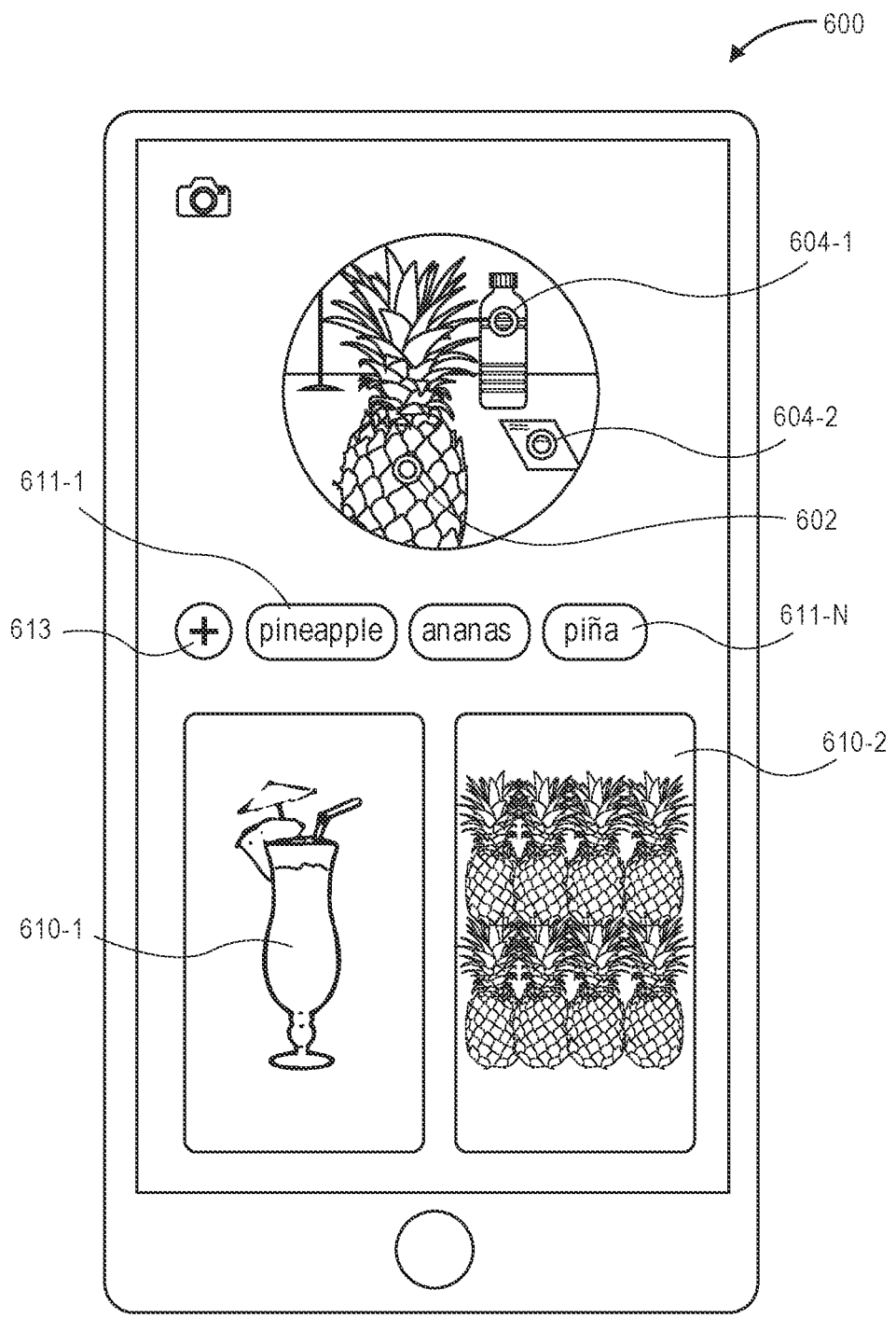
FIG. 6B illustrates visual search results for an object of interest of the input image of FIG. 6A, wherein the results include images that are related to the object of interest, according to described implementations.

Referring to FIG. 6B, illustrated are visual search results for a selected object of interest from FIG. 6A, wherein the results include images obtained from multiple query types that are related to the object of interest 602, according to described implementations.

In this example, it is determined that the object of interest, a pineapple, is a food and thus corresponds to the defined category of food. Further, it is determined that there are two different query types associated with the food category, one of which is a visual or image based search and a second of which is a text or keyword based search.

In this example, the first query type generates an object feature vector representative of the pineapple and compares the object feature vector with stored feature vectors to determine images that include objects that are visually similar to the object of interest 602. The second query type generates a text query that includes the keywords "pineapple+recipe" to search for images that relate to recipes that utilize pineapples. In some implementations, the keywords may be determined based on the object of interest and/or the category. For example, based on image processing it may be determined that the object of interest is a pineapple and thus, one of the labels may be the object of interest type (e.g., pineapple). Likewise, the food category may include or have associated therewith labels, such as "recipe" that are to be used in forming a text based query.

In other implementations, the keywords utilized by the text based query may be based on labels associated with the images determined from the image based query. For example, if the first query type is an image based search and returns images that are similar to, or include image segments that are similar to, the object of interest, labels associated with those returned images may be compared and the most frequent labels utilized as keywords for the second query type.

The results of each of the query types may be blended and presented as a ranked list of images on the user device 600. In this example, a first image 610-1 that relates to a recipe for making a Pina-colada is returned for the second query type and a second image 610-2 that includes objects (pineapples) that are visually similar to the object of interest 602 is returned for the first query type and the two are presented as blended results responsive to the image input by the user.

In some implementations, the keywords or labels, such as keywords 611-1-611-N that are determined may be presented on the user device and selectable by the user to further refine the query. A user may also add their own keywords by selecting the add control 613 and inputting additional keywords. Likewise, as discussed below, in this example, multiple objects are detected in the input image and indicators 604-1, 604-2 are also presented on the other objects such that the user can specify a different or additional objects of interest. If the user selects different or additional objects of interest, the results of the search are updated accordingly.

A user may interact with the results returned and presented on the user device, refine the search, provide additional or different keywords, select additional or different objects of interest, and/or perform other actions.

Figure 7:
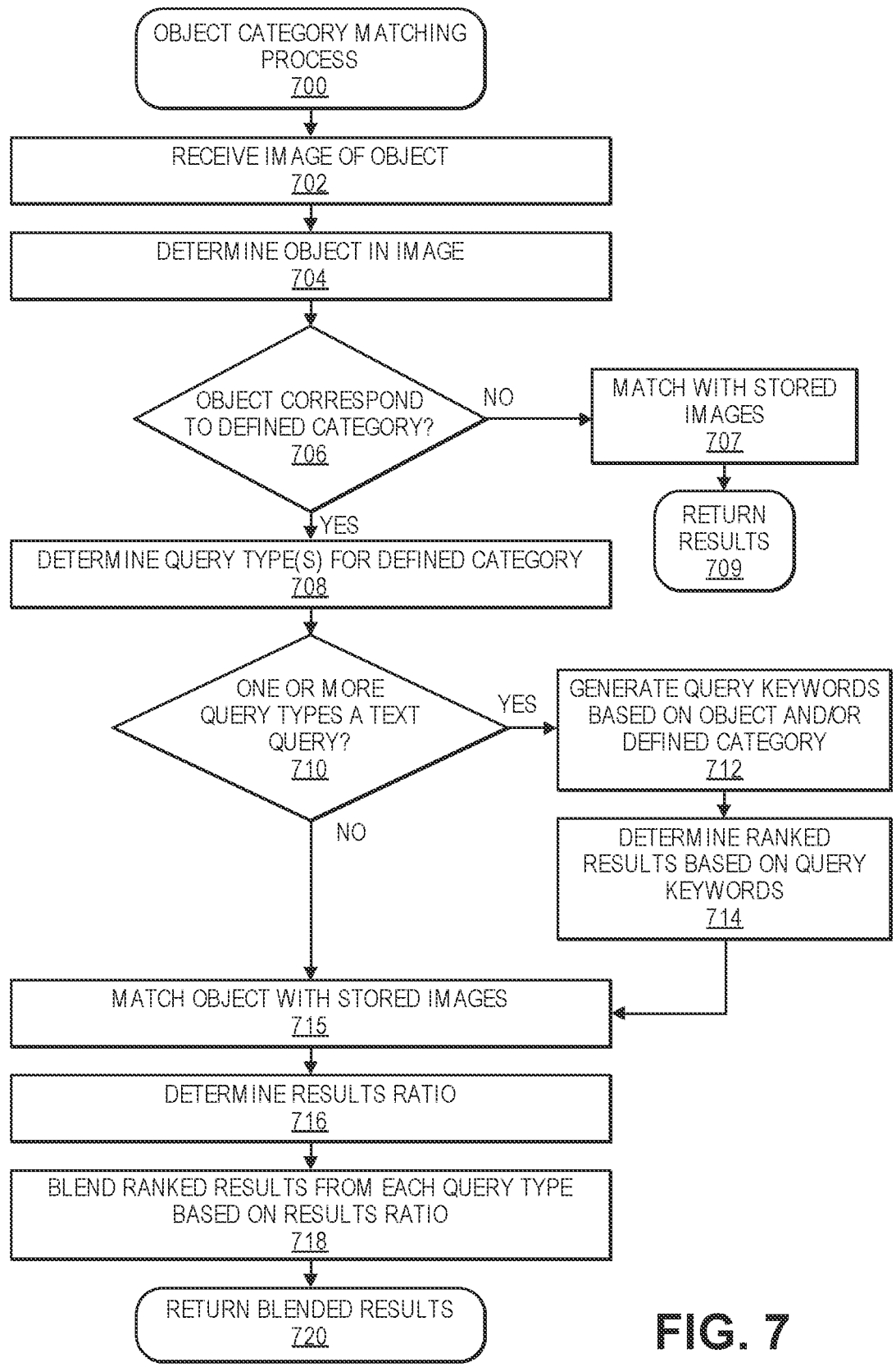
FIG. 7 is an example object category matching process, according to described implementations.

FIG. 7 is an example object category matching process 700, according to described implementations. The example process 700 begins by receiving an image that includes a representation of one or more objects, as in 702. As with the other examples discussed herein, the image may be received from any of a variety of sources.

Upon receipt of an image, the image is processed using all or a portion of the image processing process 200 (FIG. 2), discussed above, and one or more objects of interest represented in the image is determined, as in 704. In some implementations, the entire image processing process 200 may be performed and candidate objects of interest determined from the objects detected as part of the example process 200. In other implementations, one or more object detection algorithms may be performed to determine candidate objects in the image.

For example, an edge detection or object detection algorithm may be performed to detect objects in the image and then the position of the potential objects, clarity or focus of the potential objects, and/or other information may be utilized to detect candidate objects of interest. For example, in some implementations, the candidate objects of interest may be determined to be toward a center of the image, in focus, positioned in a foreground of the image, and/or positioned near one another. In some implementations, the object detection may only scan the image for objects of particular types corresponding to one or more defined categories. Defined categories may include, but are not limited to, food, home decor, and fashion. In such an implementation, the image processing may only process the image to determine if an object type associated with one of the defined categories is potentially represented in the image. As discussed above, multiple types of objects may be associated with each category and, in some implementations, an object type may be associated with more than one category.

A determination is then made as to whether the object of interest corresponds to a defined category or if an object corresponding to a defined category was identified in the image, as in 706.

An object of interest may be determined to correspond to a defined category based on the type of object of interest that is determined when the object of interest is identified (e.g., identified as part of the example process 200). In implementations when two or more objects are determined as the objects of interest, in some implementations, it may be required that both objects of interest correspond to the same defined category. In other implementations, only one object of interest may need to be associated with a defined category.

If it is determined that the object of interest does not correspond to a defined category, the received image is compared with stored image information, as in 707. For example, a feature vector representative of the received image, rather than an object of interest, may be generated and compared with stored feature vectors corresponding to stored images. In other implementations, segment feature vectors representative of one or more objects identified in the received image may be generated and compared to stored segment feature vectors, as discussed above with respect to FIG. 4. Stored images determined to be visually similar to the received image and/or segments of the received image are then returned for presentation, as in 709.

If it is determined that the object of interest does correspond to a defined category, query types associated with the defined category are determined, as in 708. As discussed above, multiple query types may be associated with a defined category and utilized to obtain different types or styles of content in response to the search.

A determination is then made as to whether one or more of the query types is a text based query to search content, as in 710. If it is determined that one of the query types is a text based query, query keywords are determined based on the object of interest, the category, the user, or based on other factors, as in 712. For example, as discussed, above, in some implementations, a text based query may be performed subsequent to a visual or image based query and the keywords may be determined from labels associated with content items/images matching the visual or image based query. For example, the frequency of words in labels associated with images returned for an image based query may be determined and keywords may be selected as those words of the labels having the highest frequency.

The keywords are then used to query labels and/or annotations associated with the stored content and a ranked results list is returned based on the matching of the keywords, as in 714.

If it is determined that the none of the query types are text based queries, or in addition to generating and submitting a text query, the received image is also compared with stored images, as in 715. Similar to block 709, the comparison may be a comparison between a feature vector representative of the received image and stored feature vectors representative of stored images and/or a comparison between one or more segment feature vectors corresponding to objects in the received image (e.g., object of interest) and stored segment feature vectors. Comparison of segment feature vectors may be performed in a manner similar to that discussed above with respect to FIG. 4, to determine images that include objects that are visually similar to the object(s) of interest.

A results ratio that indicates a ratio or percentage of content returned by each query type to be included in the ranked results that are returned to the user is then determined, as in 716. The results ratio or percentage may be determined based on a variety of factors, including, but not limited to, the category, user preference, the object of interest, the quantity or quality of results returned from each query type, the location of the user, etc.

Based on the results ratio or percentage, the ranked results from each query type are blended to produce blended results, as in 718. Finally, the blended results are returned to the user device and presented to the user as responsive to the input image that includes the object of interest, as in 720.

In some implementations, the example process 700 may be performed in whole or in part by a remote computing resource that is remote from a user device and multiple results of images corresponding to the ranked results list may be sent to a user device for presentation to a user in response to a user device submitting an image of an object of interest. In other implementations, parts of the example process 700 may be performed on the user device and parts of the example process 700 may be performed on the remote computing resources. For example, program instructions stored in a memory of the user device may be executed and cause one or more processors on the user device to receive the image of the object, determine the object of interest, and/or generate a label or object feature vector representative of the object of interest. The object feature vector and/or label may then be sent from the user device to the remote computing resources and code executing on the remote computing resources may cause one or more processors of the remote computing resources to compare the received object feature vector with one or more stored feature vectors to produce similarity scores, generate a ranked results list and send images corresponding to the ranked results list back to the user device for presentation to the user as being responsive to the input image that included the object of interest. In other implementations, different aspects of the example process 700 may be performed by different computing systems at the same or different locations.

By providing blended results, the user has the ability to view both images that include objects that are visually similar to the provided object of interest as well as images that relate to the object of interest but do not necessarily include representations of objects that are visually similar to the object of interest. Such a blending is beneficial as the user, in defined categories, is often not looking for other images of the object of interest but for information about the object of interest, combinations of the object of interest with other objects, recipes related to the object of interest, etc.

Figure 8A:
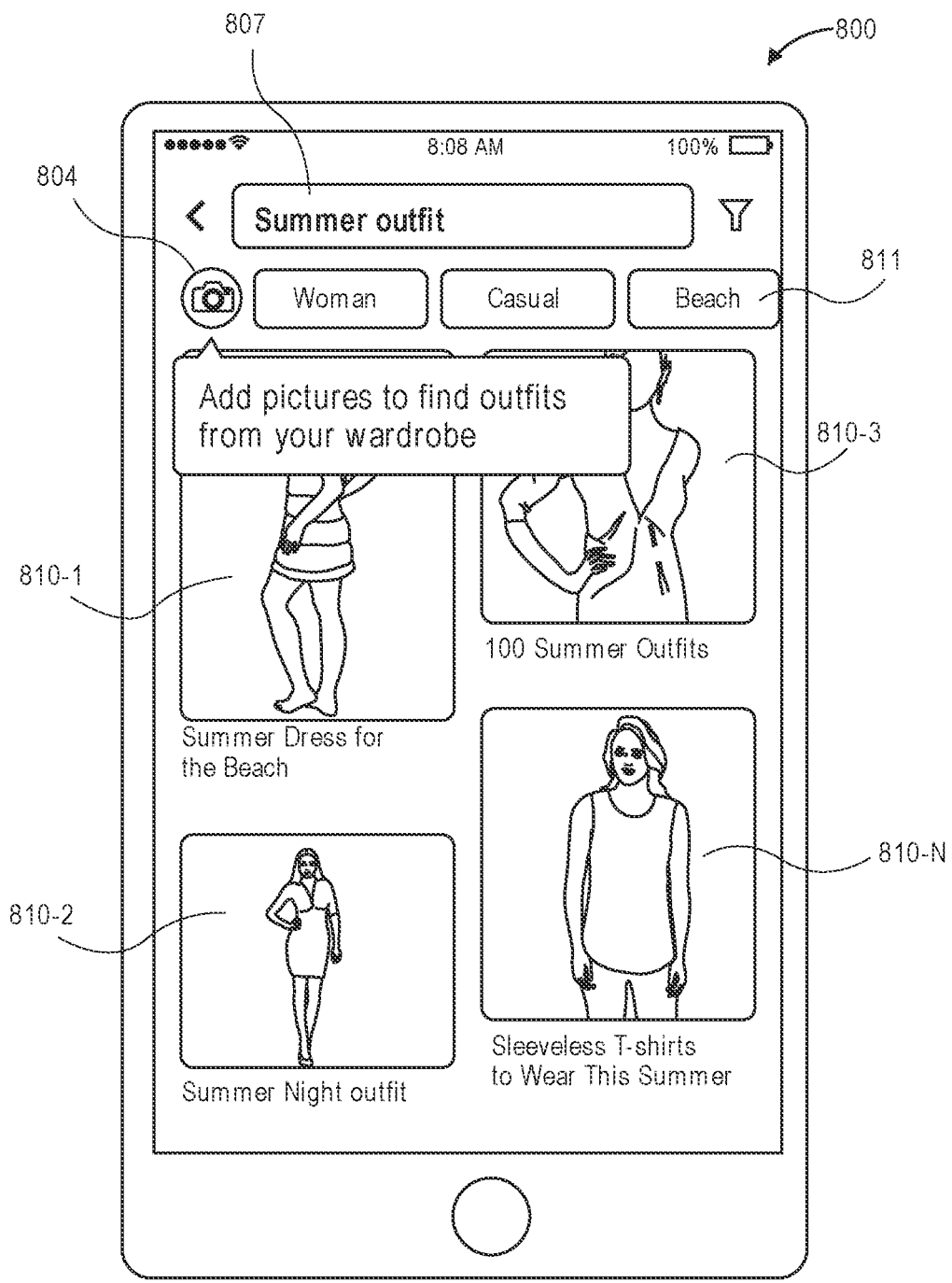
FIG. 8A illustrates a query with an option to provide a visual refinement, according to described implementations.

FIG. 8A illustrates a query on a user device with an option to provide a visual refinement, according to described implementations. In the illustrated example, a user has input a text based query 807 that includes the keywords "Summer outfit." In this example, the search input begins with a text based input and a determination is made as to whether the text based input corresponds with a defined category, such as food, fashion, or home decor. The user may then be presented with a visual refinement option, if the text input relates to a defined category, and the user may provide an image that includes an object of interest that is used to refine the results matching the text based query.

For example, the text based query 807 may be used to return images 810-1, 810-2, 810-3-810-N that are determined to include annotations, keywords, or labels that correspond with the text based query "Summer outfit." In some implementations, other keywords or labels 811 may also be presented to the user to allow the user to further refine the query. In some implementations, if the input keywords are determined to correspond to a defined category, a visual refinement option 804 is presented.

Figure 8B:
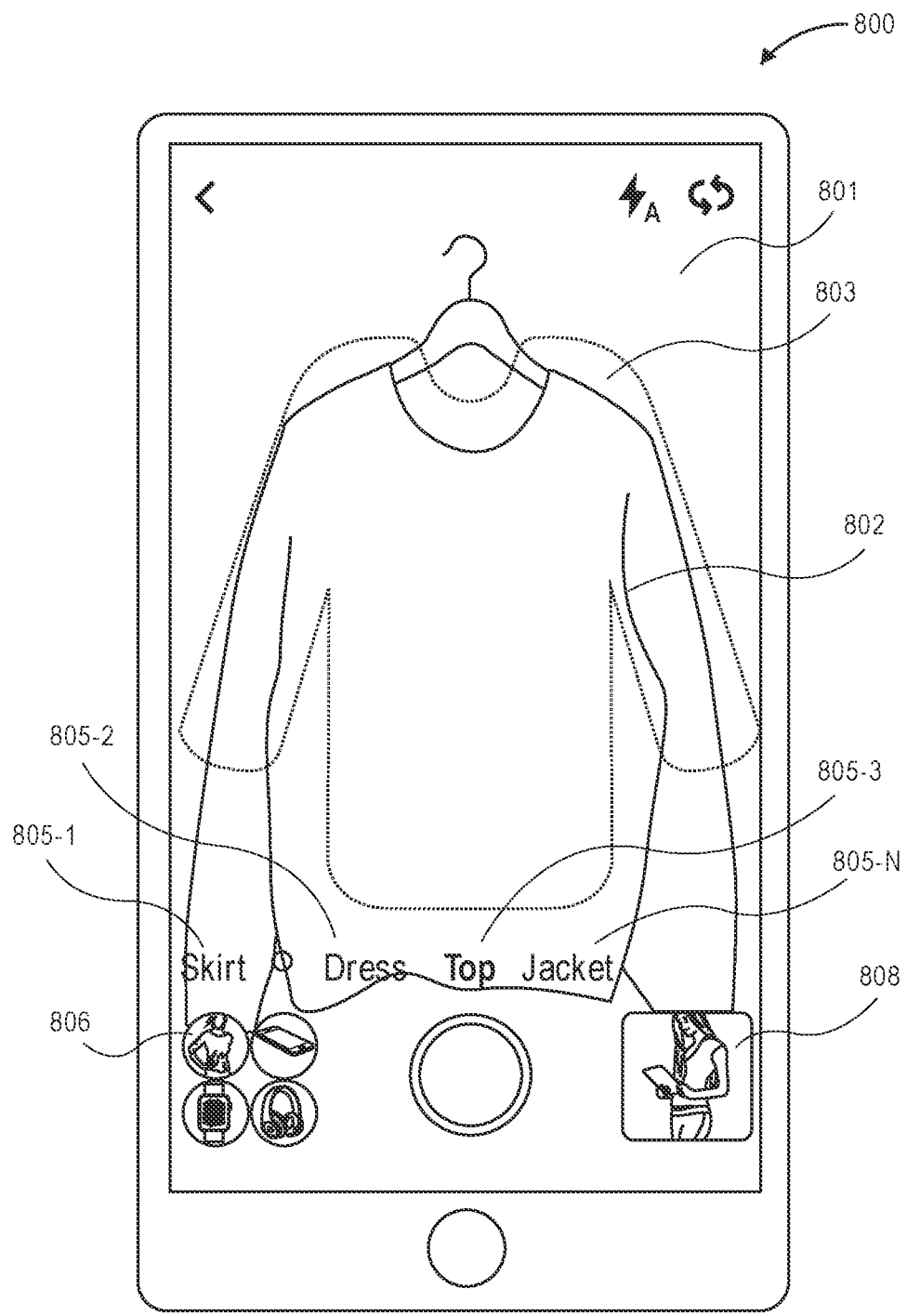
FIG. 8B illustrates visual refinement input, according to described implementations.

Referring to FIG. 8B, upon selection of the visual refinement option, the camera of the user device may be activated and an image captured by the camera and/or the field of view of the camera processed to detect a shape of objects represented in the captured image/field of view. For example, if the camera is oriented toward a sweater 802, the shape of the sweater may be detected and a suggested object type 805 presented to the user to confirm the object type that is of interest to the user. Likewise, a shape overlay 803 may also be presented on the display 801 of the user device 800 to indicate the shape of the object type currently selected.

In this example, the determined object category is fashion and the currently detected object type of the object 802 in the field of view corresponds to the object type "Top" 805-3. A user may select a different object type by selecting different indicators, such as "Skirt" 805-1, "Dress" 805-2, Jacket "805-N, etc. As will be appreciated, fewer, additional, and/or different object types and/or indicators may be presented. For example, a user may be presented with options to select based on color, fabric, style, size, texture, pattern, etc.

Likewise, in some implementations, rather than utilizing an image from the camera of the user device, the user may select the image control 808 and select an image from a memory of the user device or an image that is otherwise accessible to the user device. Alternatively, the user may select the remote images control 806 and select an image from a remote data store as the input image.

Figure 8C:
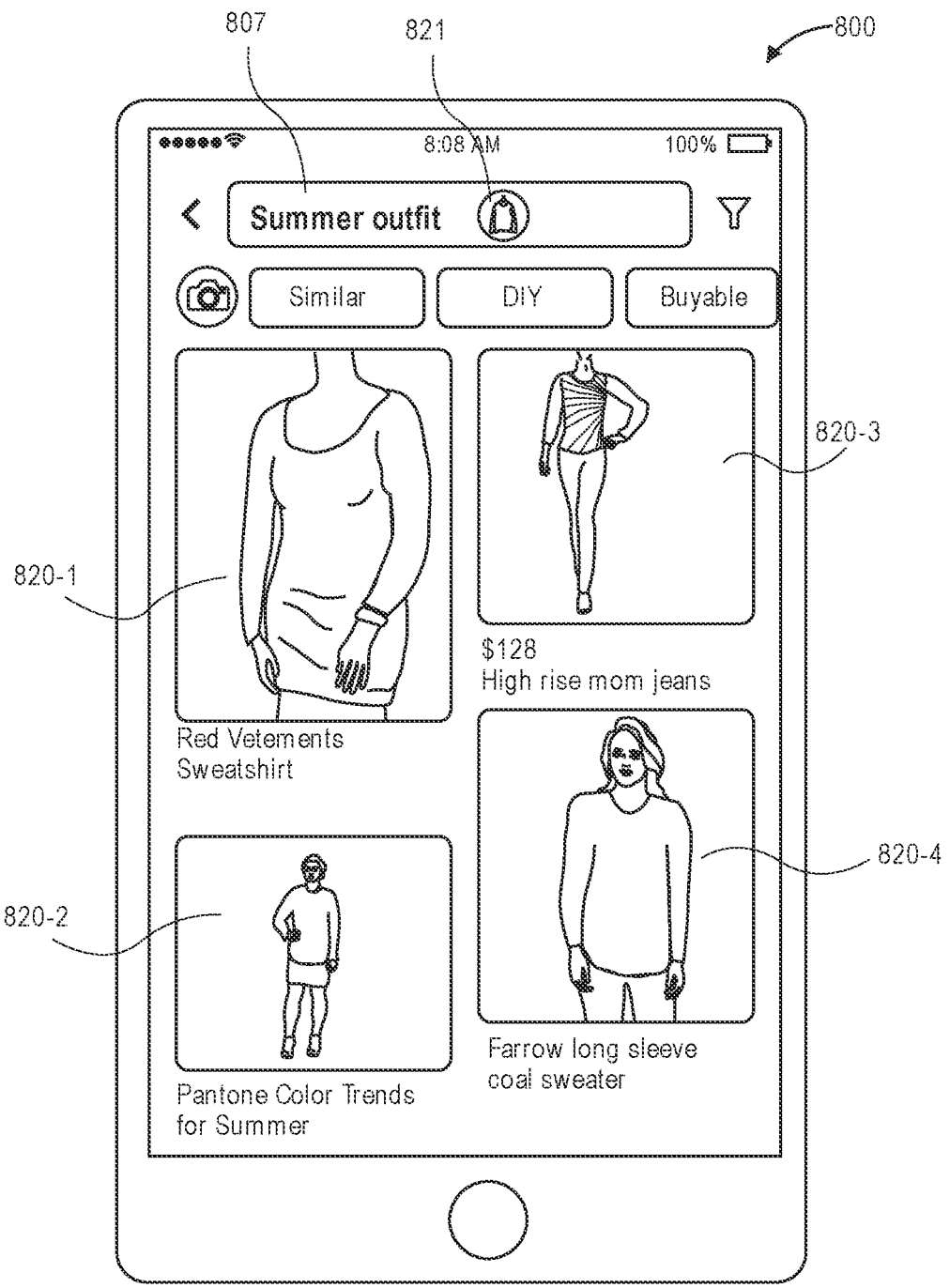
FIG. 8C illustrates search results for the query of FIG. 8A that are refined based on the visual refinement of FIG. 8B, according to described implementations.

As with the other examples, upon input of an image, the image is processed to determine the object of interest, generate labels corresponding to the object of interest, and generate a feature vector representative of the object of interest. The labels and/or feature vectors may then be utilized to refine or re-rank the images determined to correspond to the keyword search. For example, FIG. 8C illustrates search results for the query of FIG. 8A, "Summer outfit" 807 that is refined based on the visual input of FIG. 8B, as illustrated by the top icon 821, according to described implementations. Similar to the other examples, the label and/or object feature vector generated for the object of interest is utilized to generate similarity scores when compared with stored feature vectors corresponding to objects included in stored images that were determined to match the original query. In this example, the object feature vector representative of the sweater 802 (FIG. 8B) is compared to the stored feature vectors corresponding to segments of the images determined to correspond to the text query. The images are then reranked based on the similarity scores determined from the comparison of the feature vectors, as discussed above. The reranked images are then sent to the user device and presented on a display of the user device in response to the input image. For example, stored images 820-1, 820-2, 820-3, and 820-4 may be determined to include objects that are visually similar to the object of interest, ranked at the top of the reranked list, sent to the user device, and presented on the display of the user device.

Figure 9:
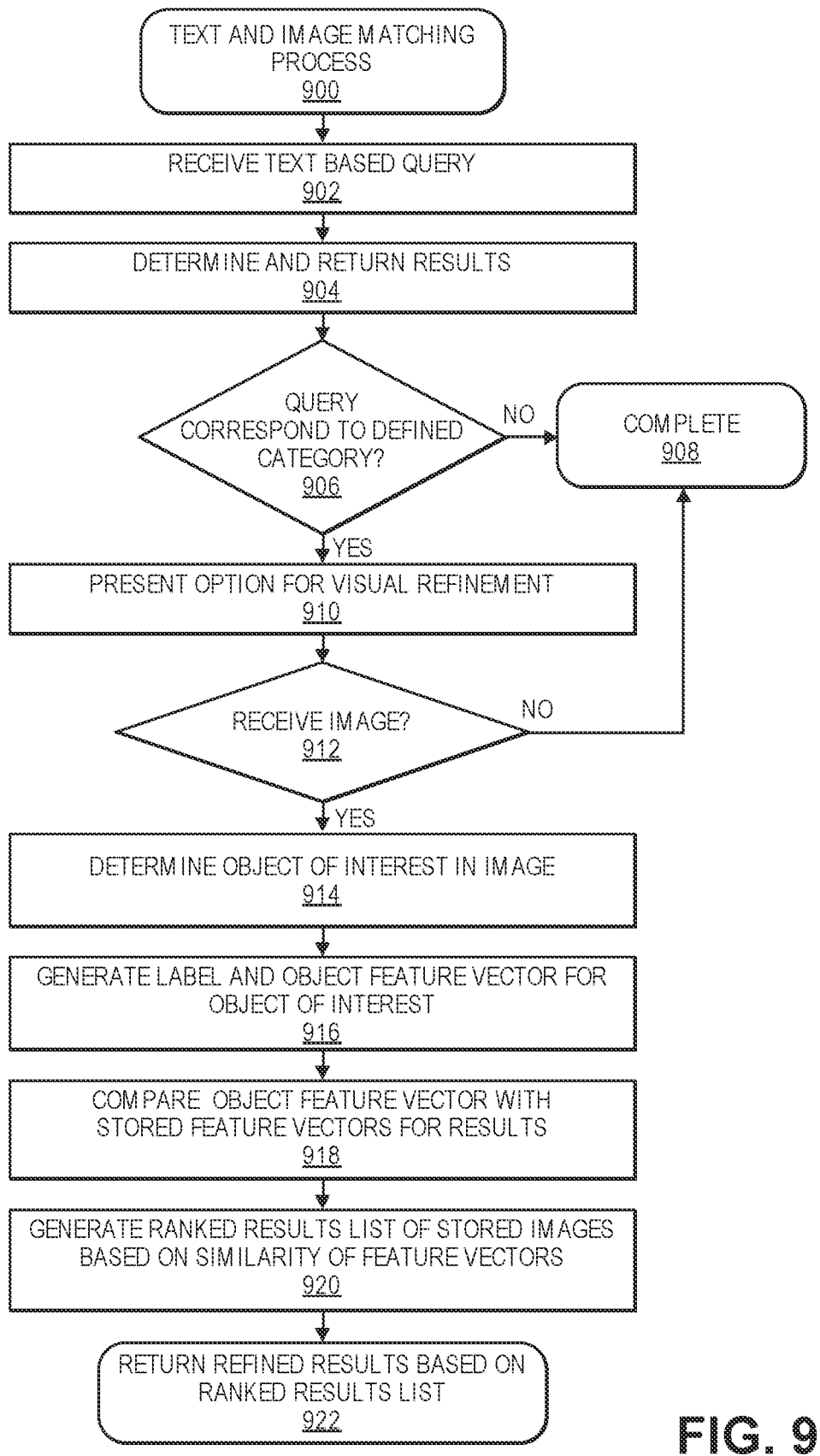
FIG. 9 is an example text and image matching process, according to described implementations.

FIG. 9 is an example text and image matching process 900, according to described implementations. The example process 900 begins upon receipt of a text based query, such as the input of one or more keywords into a search input box presented on a user device, as in 902. stored content is then queried to determine images that have associated labels or keywords that correspond with or match the text input of the query, as in 904. In addition, a determination is made as to whether the text query corresponds to a defined category, as in 906. For example, categories may be defined and include one or more keywords or labels and, if the text based input includes the keywords or labels, such as "outfits," it is determined that the query input corresponds to a defined category. If it is determined that the query does not correspond to a defined category, the example process completes, as in 908, and the user may interact with the results presented in response to the text based query.

If it is determined that the query does correspond to a defined category, an option for visual refinement of the search results is presented to the user, as in 910. The visual refinement may be, for example, a graphical button or icon that is presented with the search results that is selected by the user to activate a camera to generate an image and/or to select an existing image. In some implementations, determining whether the query corresponds to a defined category may be omitted and in each instance of the process 900, an option for visual refinement of the search results may be presented to the user, as in 910.

A determination is also made as to whether an image has been received that is to be used to refine the results of the query, as in 912. If an image is not received, the example process 900 completes, as in 908. However, if an image is received, the image is processed using all or a portion of the image processing process 200 (FIG. 2), discussed above, and an object of interest represented in the image is determined, as in 914. In some implementations, the entire image processing process 200 may be performed and then an object of interest determined from the objects detected as part of the example process 200. In other implementations, one or more object detection algorithms may be performed to determine potential objects in the image and then one of the potential objects may be selected as the object of interest and the example process 200 performed with respect to that potential object.

For example, an edge detection or object detection algorithm may be performed to detect potential objects in the image and then the position of the potential objects, clarity or focus of the potential objects, and/or other information may be utilized to detect the object of interest. For example, in some implementations, the object of interest may be determined to be toward a center of the image, in focus, and positioned in a foreground of the image. In other implementations, a user may provide an indication or selection of a segment of the image that includes the object of interest.

Upon determination of the object of interest, the image processing process 200 may be performed for that object and/or the segment of the image that includes the object to identify the object, generate a feature vector representative of the object, and produce a label corresponding to a type of the object, as in 916.

The generated object feature vector and/or label may then be compared with stored feature vectors corresponding to objects of stored images determined to match the text based query to produce a similarity score between the object feature vector and each stored feature vector, as in 918.

As discussed above, comparison of the object feature vector with stored feature vectors produces similarity scores indicating the similarity between the object feature vector and the stored feature vector with which it is compared. Images associated with stored feature vectors having a higher similarity score are determined to be more responsive to the visually refined search than stored images associated with feature vectors having a lower similarity score. Because stored images may be associated with multiple stored features vectors that may be compared with an object feature vector, in some implementations, an average similarity score may be determined for the image based on the similarity scores determined for each associated stored feature vector. In other implementations, the similarity score of an image having multiple stored feature vectors that are compared with the object feature vector may be the median similarity score, the lowest similarity score, or any other variation of the similarity scores for feature vectors associated with that stored image.

Based on the similarity scores determined for each image, the results of the text based query are re-ranked into an updated ranked list, as in 920. In some implementations, the ranked list may be based only on the similarity scores. In other implementations, one or more of the stored images may be weighted higher or lower based on other factors, such as, but not limited to, the popularity of the stored image, whether the user has previously viewed and/or interacted with the stored image, a number of stored feature vectors associated with the stored image, a number of feature vectors associated with the stored image that were compared with the object feature vector, a number of stored feature vectors associated with the stored image and having the same or similar label as the object of interest, etc.

Finally, images having the highest rank in the ranked list are returned, for example to the user device, for presentation, as in 922. In some implementations, the example process 900 may be performed in whole or in part by a remote computing resource that is remote from a user device and multiple results of images corresponding to the ranked results list may be sent to a user device for presentation to a user in response to a user device submitting an image of an object of interest. In other implementations, parts of the example process 900 may be performed on the user device and parts of the example process 900 may be performed on the remote computing resources. For example, program instructions stored in a memory of the user device may be executed and cause one or more processors on the user device to receive the image of the object, determine the object of interest, and/or generate a label or object feature vector representative of the object of interest. The object feature vector and/or label may then be sent from the user device to the remote computing resources and code executing on the remote computing resources may cause one or more processors of the remote computing resources to compare the received object feature vector with one or more stored feature vectors to produce similarity scores, generate a ranked results list and send images corresponding to the ranked results list back to the user device for presentation to the user as being responsive to the input image that included the object of interest. In other implementations, different aspects of the example process 900 may be performed by different computing systems at the same or different locations.

Figure 10A:
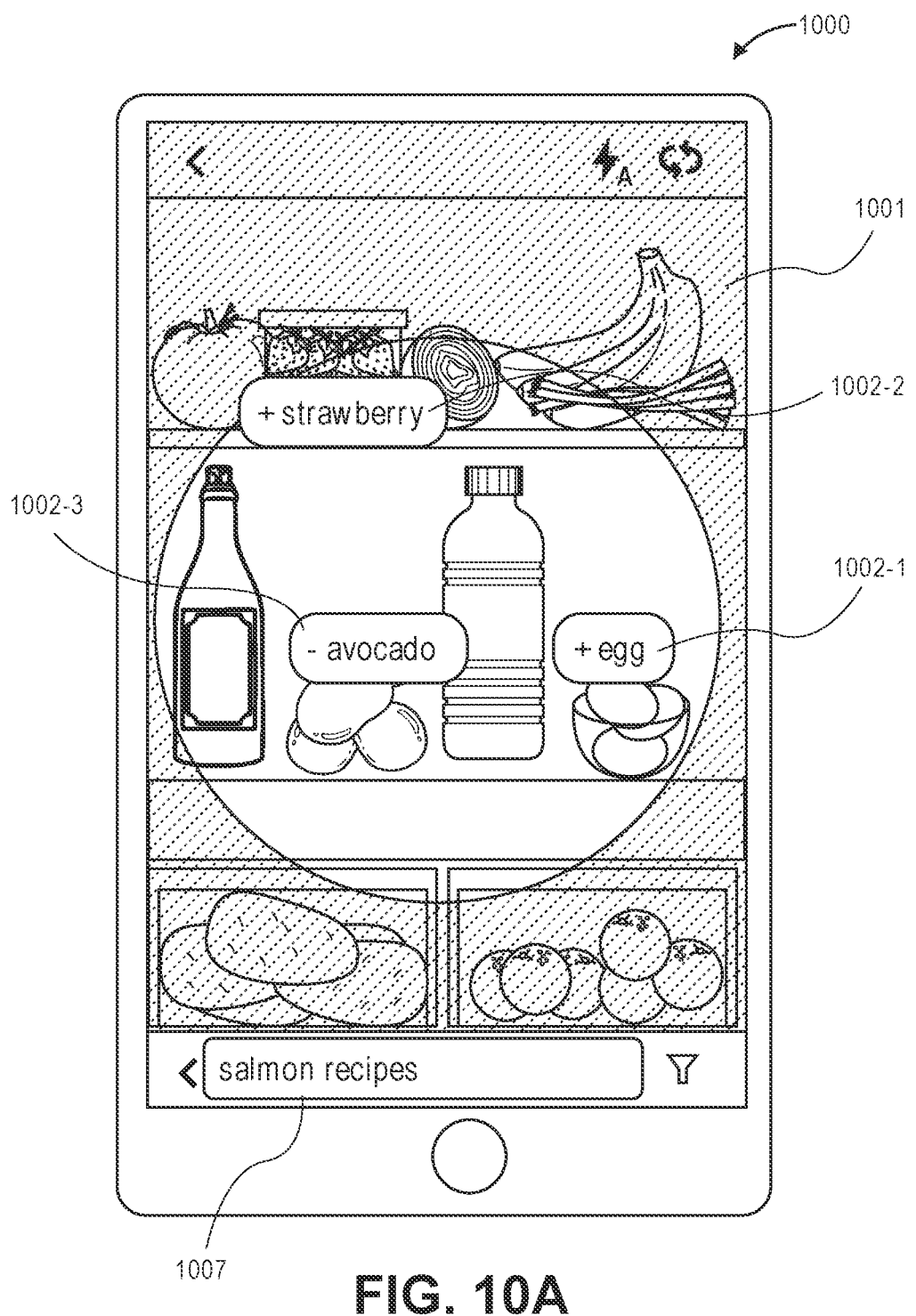
FIG. 10A illustrates an example visual refinement input for a query, according to described implementations.

FIG. 10A illustrates yet another example visual refinement input for a query, according to described implementations. In this example, the user has input a text based query "salmon recipes" 1007. It is determined that the query corresponds with a defined category (e.g., recipes) and the user is providing a visual refinement. In this example, a streaming video of the field of view of a camera on the user device 1000 is processed in real-time, or near real time to detect objects within the field of view of the camera. In this example, the field of view that is in the streaming video is an interior of a refrigerator. In other examples, other areas may be included in the streaming video. Processing may be performed on the user device 1000, by a computing resource that is remote from the user device, or a combination thereof.

As objects in the streaming video are detected, using for example an edge detection algorithm and/or a portion or all of the example process 200 (FIG. 2), keywords or labels indicating the type of the detected object are presented on the display 1001 of the device concurrent with a presentation of the streaming video.

In this example, strawberries, avocado, and eggs have been detected as candidate objects of interest in the field of view of the camera of the user device. As the objects are detected, labels 1002 are visually presented adjacent the objects to indicate that the object has been detected.

In some implementations, the speed of the process of detecting candidate objects of interest and to improve the user experience by only identifying candidate objects of interest that correspond with the keyword query, a corpus of potential objects may be determined based on the text query and only those objects matching the corpus may be identified as candidate objects. For example, the text query may be processed to determine that the user is looking for recipes that include salmon. Based on that information, a corpus of potential objects that are included or referenced in images relating to recipes that also include salmon may be determined and only objects matching that corpus may be identified as candidate objects of interest.

In this example, the candidate objects detected in the field of view of the camera of the user device are identified by the identifiers "strawberry" 1002-2, "egg" 1002-1, and "avocado" 1002-3. As the user moves the field of view of the camera, the position of the identifiers 1002 may be updated to correspond to the relative position of the detected object and, if additional candidate objects come into the field of view and included in the streaming video, identifiers for those objects may likewise be presented.

Figure 10B:
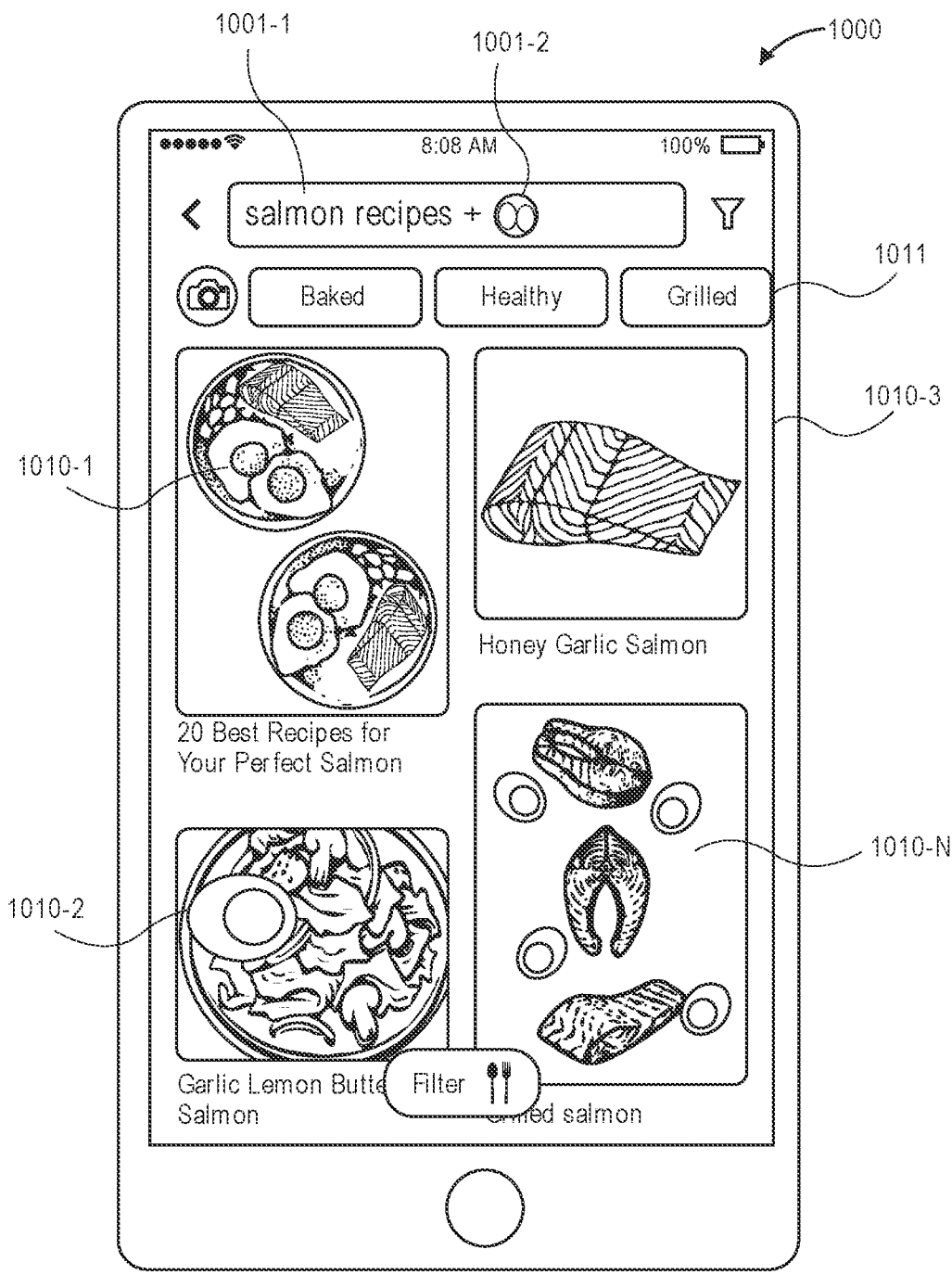
FIG. 10B illustrates search results for the query and visual refinement of FIG. 10A, according to described implementations.

A user may select one of the identifiers to indicate that the object is an object of interest. Referring to FIG. 10B, the user has selected the object eggs as the object of interest. In response, the keyword eggs is added to the query "salmon recipes" 1001-1, as illustrated by the egg icon 1001-2, and images, such as images 1010-1, 1010-2, 1010-3, and 1010-N that include or are associated with the labels/keywords of "salmon" "recipe" and "egg" are determined and returned to the user for presentation as responsive to the query. In some implementations, other keywords 1011 may likewise be presented to the user device 1000 for further refinement of the query results.

Providing the ability for users to utilize visual search and/or a combination of visual search and text based search and to produce results based on defined categories determined from the inputs and/or objects detected in the inputs improves the quality of results by better inferring from the inputs the type of content the user desires to explore. The increased flexibility through the described implementations provides a technical improvement over visual search alone that provides images that are visually similar to the input image by focusing the visual search (e.g., feature vectors) to segments or portions of stored images, rather than the entire image and/or by automatically supplementing the visual search with a different form of search (e.g., keyword). Still further, supplementing a text based query with a visual refinement that utilizes either or both visual matching through feature vectors or keyword matching allows a user to better determine and explore information of interest by expressing input parameters in different contexts (keyword, visual).

Figure 11:
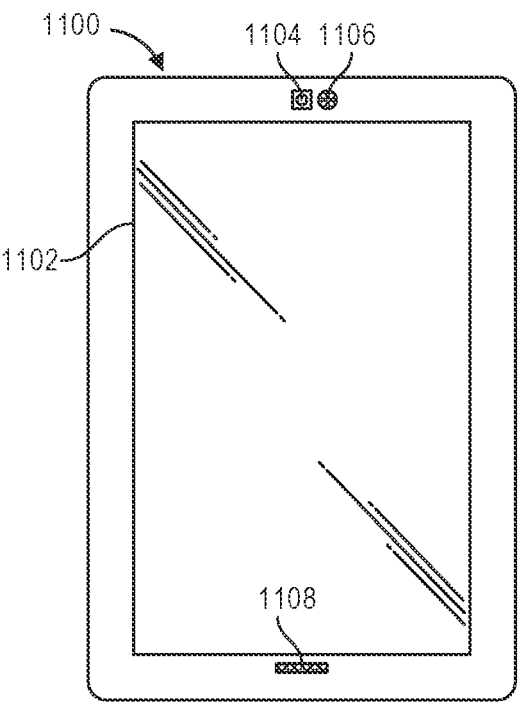
FIG. 11 illustrates an example computing device, according to an implementation.

FIG. 11 illustrates an example user device 1100 that can be used in accordance with various implementations described herein. In this example, the user device 1100 includes a display 1102 and optionally at least one input component 1104, such as a camera, on a same and/or opposite side of the device as the display 1102. The user device 1100 may also include an audio transducer, such as a speaker 1106, and optionally a microphone 1108. Generally, the user device 1100 may have any form of input/output components that allow a user to interact with the user device 1100. For example, the various input components for enabling user interaction with the device may include a touch-based display 1102 (e.g., resistive, capacitive), camera, microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 12:
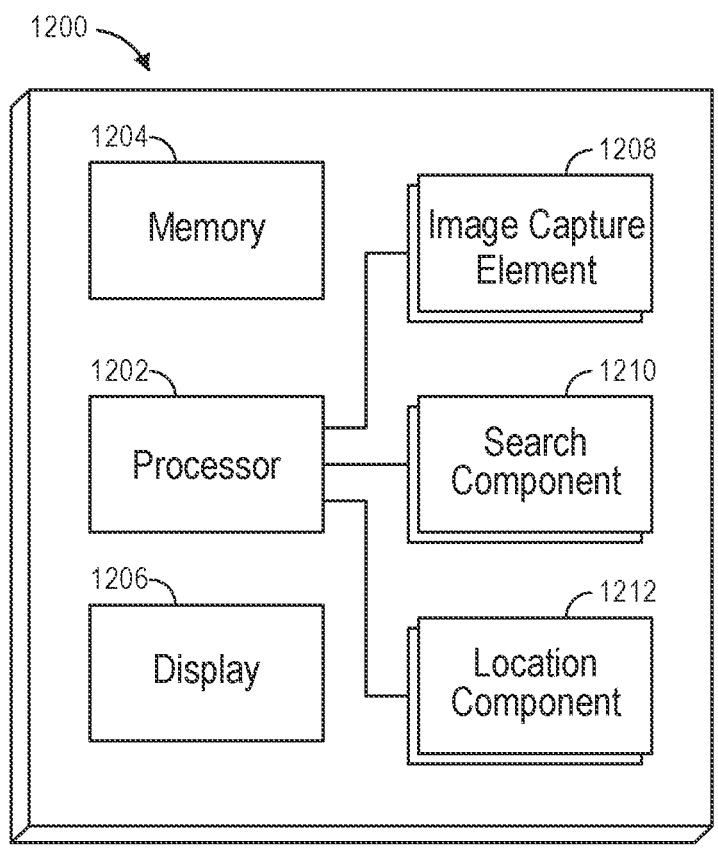
FIG. 12 illustrates an example configuration of components of a computing device, such as that illustrated in FIG. 11.

In order to provide the various functionality described herein, FIG. 12 illustrates an example set of basic components 1200 of a user device 1100, such as the user device 1100 described with respect to FIG. 11 and discussed herein. In this example, the device includes at least one central processor 1202 for executing instructions that can be stored in at least one memory device or element 1204. As would be apparent to one of ordinary skill in the art, the device can include many types of memory, data storage or computer-readable storage media, such as a first data storage for program instruction for execution by the processor 1202. Removable storage memory can be available for sharing information with other devices, etc. The device typically will include some type of display 1206, such as a touch-based display, electronic ink (e-ink), organic light emitting diode (OLED), or liquid crystal display (LCD).

As discussed, the device in many implementations will include at least one image capture element 1208, such as one or more cameras that are able to image objects in the vicinity of the device. An image capture element can include, or be based at least in part upon, any appropriate technology, such as a CCD or CMOS image capture element having a determined resolution, focal range, viewable area, and capture rate. The device can include at least one search component 1210 for performing the process of generating search terms, labels and/or identifying and presenting results matching a selected search term. For example, the user device may be in constant or intermittent communication with a remote computing resource and may exchange information, such as selected search terms, images, labels, etc., with the remote computing system as part of the search process.

The device also can include at least one location component 1212, such as GPS, NFC location tracking or Wi-Fi location monitoring. Location information obtained by the location component 1212 may be used with the various implementations discussed herein as a factor in selecting images matching objects of interest. For example, if the user is in San Francisco and provides a positive selection of a bridge (object) represented in an image, the user's location may be considered as a factor when identifying visually similar objects, such as the Golden Gate Bridge.

The example user device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations.

FIG. 13 is a pictorial diagram of an illustrative implementation of a server system 1300, such as a remote computing resource, that may be used with one or more of the implementations described herein. The server system 1300 may include a processor 1301, such as one or more redundant processors, a video display adapter 1302, a disk drive 1304, an input/output interface 1306, a network interface 1308, and a memory 1312. The processor 1301, the video display adapter 1302, the disk drive 1304, the input/output interface 1306, the network interface 1308, and the memory 1312 may be communicatively coupled to each other by a communication bus 1310.

The video display adapter 1302 provides display signals to a local display permitting an operator of the server system 1300 to monitor and configure operation of the server system 1300. The input/output interface 1306 likewise communicates with external input/output devices, such as a mouse, keyboard, scanner, or other input and output devices that can be operated by an operator of the server system 1300. The network interface 1308 includes hardware, software, or any combination thereof, to communicate with other computing devices. For example, the network interface 1308 may be configured to provide communications between the server system 1300 and other computing devices, such as the user device 1100.

The memory 1312 generally comprises random access memory (RAM), read-only memory (ROM), flash memory, and/or other volatile or permanent memory. The memory 1312 is shown storing an operating system 1314 for controlling the operation of the server system 1300. A binary input/output system (BIOS) 1316 for controlling the low-level operation of the server system 1300 is also stored in the memory 1312.

The memory 1312 additionally stores program code and data for providing network services that allow user devices 1100 and external sources to exchange information and data files with the server system 1300. Accordingly, the memory 1312 may store a browser application 1318. The browser application 1318 comprises computer executable instructions, that, when executed by the processor 1301, generate or otherwise obtain configurable markup documents such as Web pages. The browser application 1318 communicates with a data store manager application 1320 to facilitate data exchange and mapping between the data store 1303, user devices, such as the user device 1100, external sources, etc.

As used herein, the term "data store" refers to any device or combination of devices capable of storing, accessing and retrieving data, which may include any combination and number of data servers, databases, data storage devices and data storage media, in any standard, distributed or clustered environment. The server system 1300 can include any appropriate hardware and software for integrating with the data store 1303 as needed to execute aspects of one or more applications for the user device 1100, the external sources and/or the Search service 1305. The server system 1300 provides access control services in cooperation with the data store 1303 and is able to generate content such as matching search results, images containing visually similar objects, indexes of images having visually similar objects, and the like.

The data store 1303 can include several separate data tables, databases or other data storage mechanisms and media for storing data relating to a particular aspect. For example, the data store 1303 illustrated includes digital items (e.g., images) and corresponding metadata (e.g., labels, indexes) about those items. Search history, user preferences, profiles and other information may likewise be stored in the data store.

It should be understood that there can be many other aspects that may be stored in the data store 1303, which can be stored in any of the above listed mechanisms as appropriate or in additional mechanisms of any of the data stores. The data store 1303 may be operable, through logic associated therewith, to receive instructions from the server system 1300 and obtain, update or otherwise process data in response thereto.

The memory 1312 may also include the search service 1305. The search service 1305 may be executable by the processor 1301 to implement one or more of the functions of the server system 1300. In one implementation, the search service 1305 may represent instructions embodied in one or more software programs stored in the memory 1312. In another implementation, the search service 1305 can represent hardware, software instructions, or a combination thereof. The search service 1305 may perform some or all of the implementations discussed herein, alone or in combination with other devices, such as the user device 1100.

The server system 1300, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction in FIG. 13 should be taken as being illustrative in nature and not limiting to the scope of the disclosure.

The concepts disclosed herein may be applied within a number of different devices and computer systems, including, for example, general-purpose computing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the art should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "similar," or "substantially" as used herein, represent a value, amount, or characteristic close to the stated value, amount, or characteristic that still performs a desired function or achieves a desired result. For example, the terms "about," "approximately," "generally," "nearly," "similar," or "substantially" may refer to an amount that is within less than 10% of, within less than 5% of, within less than 1% of, within less than 0.1% of, and within less than 0.01% of the stated amount.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
   one or more processors; and
   a memory storing program instructions that when executed by the one or more processors, cause the one or more processors to at least:
      receive a text query;
      provide a visual refinement option;
      determine and return a plurality of results corresponding to the text query;
      receive an object as part of the visual refinement option;
      generate an object label for the object;
      generate an object feature vector representative of the object;
      determine, based at least in part on the object label for the object, a first plurality of stored feature vectors from a plurality of stored feature vectors corresponding to segments of visual items included in the plurality of results;

compare the object feature vector with the first plurality of stored feature vectors to determine a plurality of respective similarity scores, each of the respective similarity scores representative of a similarity between the object feature vector and a respective one of the plurality of stored feature vectors;

generate a ranked list of a plurality of results based at least in part on the plurality of respective similarity scores; and present at least some results of the ranked list in response to the receipt of the object.

2. The computing system of claim 1, wherein execution of the programming instructions further cause the one or more processors to, at least:

identify a plurality of items represented in the object;
determine an item of interest of the plurality of items; and
generate a feature vector for the item of interest as the object feature vector representative of the object.

3. The computing system of claim 2, wherein execution of the programming instructions further causes the one or more processors to, at least:

determine a defined category corresponding to the text query;
determine a label for each item of the plurality of items represented in the object; and
identify a first item of the plurality of items whose label is associated with the defined category, the first item being the item of interest.

4. The computing system of claim 3, wherein execution of the programming instructions further causes the one or more processors to, at least:

for items whose label is associated with the defined category:
present the labels as user-selectable controls in proximity to the corresponding items represented in the object;
receive a selection of a first label; and
identify the item corresponding to the first label as the first item.

5. The computing system of claim 2, wherein execution of the programming instructions further causes the one or more processors to, at least:

identify a plurality of segments of the object, each segment comprising less than the entire object; and
identify the plurality of items represented in the object from items represented in the plurality of segments.

6. The computing system of claim 5, wherein the object is one of a video content or an image content, and wherein the plurality of items represented in the object are identified from items represented in the plurality of segments of the object according to an edge detection algorithm.

7. The computing system of claim 5, further comprising:
for each segment of the plurality of segments of the object:
identifying a background of a segment; and
removing the background of the segment; and
processing the plurality of segments with the background removed to identify the plurality of items represented in the object.

8. A computer-implemented method, comprising:
under the control of one or more processors executing instructions on a computer system, and in response to a presentation of a first image on a display of the computer system:

determining a first object of a plurality of objects represented in the first image;
generating a first label for the first object;
generating a first feature vector representative of the first object;
determining, based at least in part on the first label for the first object, a first plurality of stored feature vectors from a plurality of stored feature vectors, each stored feature vector of the plurality of stored feature vectors corresponding to an image maintained in a data store;
comparing the first feature vector with the first plurality of stored feature vectors to generate a plurality of similarity scores between the first feature vector and the first plurality of stored feature vectors;
selecting a result set of feature vectors of the first plurality of stored feature vectors having highest similarity scores from the plurality of similarity scores;
identifying a result set of images corresponding to the feature vectors of the results set of feature vectors; and
presenting at least some images of the result set of images on the display of the computer system.

9. The computer-implemented method of claim 8, further comprising:
segmenting the first image into a plurality of segments; and
identifying the plurality of objects from the plurality of segments of the first image.

10. The computer-implemented method of claim 9, further comprising:
for each segment of the plurality of segments:
identifying a background of a segment; and
removing the background of the segment; and
identifying the plurality of objects from the plurality of segments having the background removed.

11. The computer-implemented method of claim 8, wherein the first object is determined from the plurality of objects represented in the first image according to a foreground and centered position of the first object in the first image.

12. The computer-implemented method of claim 8, wherein determining the first object of the plurality of objects comprises:
presenting user-selectable selectors on the display corresponding to at least some objects of the plurality of objects;
receiving an indication of a selection of a first user-selectable selector corresponding to a selected object of the at least some objects; and
identifying the selected object as the first object.

13. The computer-implemented method of claim 12, further comprising:
determining a label for each object of the at least some objects; and
wherein each user-selectable selector includes a presentation of the label of the corresponding object.

14. A computer-implemented method, comprising:
under a control of one or more processors executing instructions on a computer system:
receiving a text query for items of content maintained in a data store by the computer system;

receiving a visual content as a refinement to the text query;

processing the visual content to detect a plurality of objects represented within the visual content;

determining a text label for each object of the plurality of objects;

presenting selectors corresponding to the text labels of at least some objects of the plurality of objects, wherein presenting the selectors includes presenting each selector in proximity to a corresponding object of the at least some objects and concurrently with the visual content on a display of the computer system, and wherein each selector is user-selectable;

receiving a selection of a first selector corresponding to a first text label of a first object of the at least some objects;

determining, based at least in part on the first text label corresponding to the selected first selector, a first plurality of items of content from the items of content;

identifying a set of items of content from the first plurality of items of content according to the text query as refined by the first text label; and presenting the set of items of content on the display of the computer system.

15. The computer-implemented method of claim 14, further comprising:

determining a defined category corresponding to the text query; and identifying a subset of objects of the plurality of objects, wherein the text label of each object of the subset of objects is associated with the defined category; and wherein the at least some objects of the plurality of objects are included in the subset of objects.

16. The computer-implemented method of claim 15, further comprising:

generating an embedding vector for the first object;

comparing the embedding vector for the first object with embedding vectors associated with the objects of the subset of objects to generate a similarity score for each object of the subset of objects, each similarity score representative of a similarity between a corresponding object of the subset of objects and the first object; and identifying the at least some objects of the subset of objects as objects having highest similarity scores.

17. The computer-implemented method of claim 14, further comprising and concurrent with the presentation of the at least some items of content on the display of the computer:

displaying the text query in an input field on the display, and further displaying an image representative of the first object in the input field with the text query.

18. The computer-implemented method of claim 14, further comprising:

processing the visual content into a plurality of segments; and processing the plurality of segments to identify the plurality of objects represented within the visual content.

19. The computer-implemented method of claim 18, further comprising:

for each segment of the plurality of segments:
  identifying a background of a segment; and
  removing the background of the segment; and processing the plurality of segments with the background removed to identify the plurality of objects represented within the visual content.

20. The computer-implemented method of claim 18, wherein the plurality of segments are processed according to an edge detection algorithm to identify the plurality of objects represented within the visual content.

\* \* \* \* \*